(12) United States Patent
Vishwanathan et al.

(10) Patent No.: US 6,996,414 B2
(45) Date of Patent: Feb. 7, 2006

(54) SYSTEM AND METHOD OF GROUP CALLING IN MOBILE COMMUNICATIONS

(75) Inventors: Kumar K. Vishwanathan, Windham, NH (US); Rangamani Sundar, Windham, NH (US); Murali Aravamudan, Windham, NH (US); Shamim A. Naqvi, Morristown, NJ (US); Kajamalai G. Ramakrishnan, Tewksbury, MA (US); Prakash R. Iyer, Tewksbury, MA (US)

(73) Assignee: Motorola, Inc., Schaumburg, IL (US)

( * ) Notice: Subject to any disclaimer, the term of this patent is extended or adjusted under 35 U.S.C. 154(b) by 468 days.

(21) Appl. No.: 09/845,934

(22) Filed: Apr. 30, 2001

(65) Prior Publication Data

US 2003/0017836 A1  Jan. 23, 2003

(51) Int. Cl.
 *H04B 7/00* (2006.01)
(52) U.S. Cl. ........................ 455/518; 455/517; 455/519
(58) Field of Classification Search ........ 455/517–520, 455/507–509, 566, 453, 464, 515, 166.02, 455/456.1, 456.6, 524–528, 521, 456–457, 455/554, 450, 452; 370/340, 341, 329, 327, 370/349; 320/327–340, 312, 349
See application file for complete search history.

(56) References Cited

U.S. PATENT DOCUMENTS

| | | | | |
|---|---|---|---|---|
| 5,613,209 A | * | 3/1997 | Peterson et al. ............. | 455/518 |
| 5,711,007 A | | 1/1998 | Lin et al. ..................... | 455/447 |
| 5,850,594 A | * | 12/1998 | Cannon et al. ............. | 340/7.21 |
| 5,974,300 A | | 10/1999 | LaPorta et al. ............. | 455/31.2 |
| 6,032,051 A | * | 2/2000 | Hall et al. ................... | 455/518 |
| 6,104,925 A | * | 8/2000 | Grube et al. ................. | 455/428 |
| 6,111,858 A | * | 8/2000 | Greaves et al. ............. | 370/256 |
| 6,134,450 A | * | 10/2000 | Nordeman ................... | 455/517 |
| 6,157,622 A | * | 12/2000 | Tanaka et al. ............... | 370/312 |
| 6,157,843 A | * | 12/2000 | Derango et al. ............. | 455/518 |
| 6,161,008 A | * | 12/2000 | Lee et al. ..................... | 455/414 |
| 6,240,069 B1 | * | 5/2001 | Alperovich et al. ........ | 370/260 |
| 6,308,079 B1 | * | 10/2001 | Pan et al. ..................... | 455/519 |
| 6,314,301 B1 | * | 11/2001 | Dorenbosch et al. ........ | 455/519 |
| 6,331,983 B1 | * | 12/2001 | Haggerty et al. ........... | 370/400 |
| 6,346,873 B1 | * | 2/2002 | Suzuki et al. ................ | 340/3.41 |
| 6,363,258 B1 | * | 3/2002 | Schmidt et al. ............. | 455/514 |
| 6,377,161 B1 | | 4/2002 | Gromelski et al. ......... | 340/7.45 |
| 6,385,461 B1 | * | 5/2002 | Raith ........................... | 455/518 |
| 6,405,035 B1 | * | 6/2002 | Singh ........................... | 455/414 |
| 6,405,050 B1 | * | 6/2002 | Amirijoo et al. ........... | 455/518 |
| 6,427,075 B1 | * | 7/2002 | Burg et al. .................. | 455/422 |
| 6,434,396 B1 | * | 8/2002 | Rune ............................. | 455/502 |
| 6,442,396 B1 | * | 8/2002 | Schmidt et al. ............. | 455/518 |
| 6,449,483 B1 | * | 9/2002 | Akhteruzzaman et al. .. | 455/445 |
| 6,449,491 B1 | * | 9/2002 | Dailey ......................... | 455/518 |
| 6,477,387 B1 | * | 11/2002 | Jackson et al. .............. | 455/519 |
| 6,484,037 B1 | * | 11/2002 | Schmidt et al. ............. | 455/514 |
| 6,501,957 B2 | * | 12/2002 | Muhonen et al. ........... | 455/503 |

(Continued)

*Primary Examiner*—Pablo N. Tran
(74) *Attorney, Agent, or Firm*—Lalita W. Pace

(57) ABSTRACT

Information is retrieved from a list of members of a group call group. Based on the retrieved information, a group call is established between first and second mobile stations (MS). The first MS is served by a first base station controller (BSC) and the second MS is served by a second BSC. Voice data for the group call is transmitted in a multicast session. Based on a history of group calls between two points in a mobile communications network, a determination is made as to whether to establish a multicast session between the two points, e.g., in anticipation of a future group call.

4 Claims, 19 Drawing Sheets

U.S. PATENT DOCUMENTS

| | | | |
|---|---|---|---|
| 6,512,930 B2 * | 1/2003 | Sandegren | 455/518 |
| 6,516,200 B1 * | 2/2003 | Schmidt et al. | 455/518 |
| 6,625,420 B1 * | 9/2003 | Naqvi et al. | 455/8 |
| 6,625,449 B1 * | 9/2003 | Naqvi et al. | 455/428 |
| 6,633,767 B2 * | 10/2003 | Vishwanathan et al. | 455/560 |
| 6,650,909 B1 * | 11/2003 | Naqvi et al. | 455/560 |
| 6,662,010 B1 * | 12/2003 | Tseitlin et al. | 455/426.1 |
| 2002/0037723 A1 * | 3/2002 | Roach | 455/435 |
| 2002/0102967 A1 * | 8/2002 | Chang et al. | 455/414 |
| 2002/0102999 A1 * | 8/2002 | Maggenti et al. | 455/518 |
| 2002/0150091 A1 * | 10/2002 | Lopponen et al. | 370/389 |

* cited by examiner

SYSTEM AND METHOD OF GROUP CALLING IN MOBILE COMMUNICATIONS

BACKGROUND OF THE INVENTION

1. Field of the Invention

This invention relates to mobile communications and, more particularly, to a system and method of group calling in mobile communications.

2. Discussion of Related Art

All modern mobile communication systems have a hierarchical arrangement, in which a geographical "coverage area" is partitioned into a number of smaller geographical areas called "cells." Referring to FIG. 1, each cell is preferably served by a Base Transceiver Station ("BTS") 102a. Several BTS 102b–n are aggregated via fixed links 104a–n into a Base Station Controller ("BSC") 106a. The BTSs and BSC are sometimes collectively referred to as the Base Station Subsystem ("BS") 107. Several BSCs 106b–n may be aggregated into a Mobile Switching Center ("MSC") 110 via fixed links 108a–n.

MSC 110 acts as a local switching exchange (with additional features to handle mobility management requirements, discussed below) and communicates with the phone network ("PSTN") 120 through trunk groups. Under U.S. mobile networks, there is a concept of a home MSC and a Serving MSC. The home MSC is the MSC corresponding to the exchange associated with a Mobile Station ("MS"); this association is based on the phone number, e.g., area code, of the MS. (The home MSC is responsible for the HLR discussed below.) The Serving MSC, on the other hand, is the exchange used to connect the MS call to the PSTN (as the subscriber roams in the area covered by the service provider, different MSCs perform the function of the Serving MSC). Consequently, sometimes the home MSC and the Serving MSC are the same entity, but other times they are not (e.g., when the MS is roaming). Typically, a Visiting Location Register ("VLR") 116 is co-located with the MSC 110 and a logically singular HLR is used in the mobile network. As will be explained below, the HLR and VLR are used for storing many types of subscriber information and profiles.

Briefly, one or more radio channels 112 are associated with the entire coverage area. The radio channels are partitioned into groups of channels allocated to individual cells. The channels are used to carry signaling information to establish call connections and the like, and to carry voice or data information once a call connection is established.

At a relatively high level of abstraction, mobile network signaling involves at least two main aspects. One aspect involves the signaling between an MS and the rest of the network. With 2G ("2G" is the industry term used for "second generation") and later technology, this signaling concerns access methods used by the MS (e.g., time-division multiple access, or TDMA; code-division multiple access, or CDMA), assignment of radio channels, authentication, etc. A second aspect involves the signaling among the various entities in the mobile network, such as the signaling among MSCs, VLRs, HLRs, etc. This second part is sometimes referred to as the Mobile Application Part ("MAP") especially when used in the context of Signaling System No. 7 ("SS7").

The various forms of signaling (as well as the data and voice communication) are transmitted and received in accordance with various standards. For example, the Electronics Industries Association ("EIA") and Telecommunications Industry Association ("TIA") help define many U.S. standards, such as IS-41, which is a MAP standard. Analogously, the CCITT and ITU help define international standards, such as GSM-MAP, which is an international MAP standard. Information about these standards is well known and may be found from the relevant organizing bodies as well as in the literature, see, e.g., Bosse, SIGNALING IN TELECOMMUNICATIONS NETWORKS (Wiley 1998).

To deliver a call from an MS 114, a user dials the number and presses "send" on a cell phone or other MS. The MS 114 sends the dialed number indicating the service requested to the MSC 110 via the BS 107. The MSC 110 checks with an associated VLR 116 (more below) to determine if the MS 114 is allowed the requested service. The Serving MSC routes the call to the local exchange of the dialed user on the PSTN 120. The local exchange alerts the called user terminal, and an answer back signal is routed back to the MS 114 through the serving MSC 110 which then completes the speech path to the MS. Once the setup is completed the call may proceed.

To deliver a call to a MS 114, (assuming that the call originates from the PSTN 120) the PSTN user dials the MS's associated phone number. At least according to U.S. standards, the PSTN 120 routes the call to the MS's home MSC (which may or may not be the one serving the MS). The MSC then interrogates the HLR 118 to determine which MSC is currently serving the MS. This also acts to inform the serving MSC that a call is forthcoming. The home MSC then routes the call to the Serving MSC. The serving MSC pages the MS via the appropriate BS. The MS responds and the appropriate signaling links are setup.

During a call, the BS 107 and MS 114 may cooperate to change channels or BTSs 102, if needed, for example, because of signal conditions. These changes are known as "handoffs," and they involve their own types of known messages and signaling.

One aspect of MAP involves "mobility management." Briefly, different BSs and MSCs may be needed and used to serve an MS, as the MS 114 roams to different locations. Mobility management ensures that the Serving MSC has the subscriber profile and other information the MSC needs to service (and bill) calls correctly. To this end, MSCs use a Visiting Location Register ("VLR") 116 and a Home Location Register ("HLR ") 118. The HLR is used to store and retrieve the mobile identification number ("MIN"), the electronic serial number ("ESN"), MS status, and the MS service profile, among other things. The VLR stores similar information in addition to storing an MSC identification that identifies the (Home) MSC. In addition, under appropriate MAP protocols, location update procedures (or registration notifications) are performed so that the home MSC of a mobile subscriber knows the location of its users. These procedures are used when a MS roams from one location to another or when a MS is powered on and registers itself to access the network. For example a location update procedure may proceed with the MS 114 sending a location update request to the VLR 116 via the BS 107 and MSC 110. The VLR 116 sends a location update message to the HLR 118 serving the MS 114, and the subscriber profile is downloaded from the HLR 118 to the VLR 116. The MS 114 is sent an acknowledgement of a successful location update. The HLR 118 requests the VLR (if any) that previously held profile data to delete the data related to the relocated MS 114.

FIG. 2 shows in more detail the signaling and user traffic interfaces between a BS 107 and an MSC 110 in a CDMA mobile network. The BS 107 communicates signaling information using the A1 interface. The A2 interface carries the user traffic (e.g., voice signals) between the switch component 204 of the MSC and the BS 107. The A5 interface is used to provide a path for user traffic for circuit-switched data calls (as opposed to voice calls) between the source BS and the MSC.

Moreover, subscribers are demanding newer services, e.g., "data calls" to the Internet. For some of these services MSCs are not cost effective because they were primarily designed for voice calls. Integration of new services into the MSC is complicated or infeasible because of the proprietary and closed designs used by many MSC software architectures. That is, the software logic necessary to provide the services is not easy to add to the MSC 110. Often, a switch adjunct is used to provide such services. For example, an Inter-Working Function ("IWF") is an adjunct to route a data call to the Internet. Either approach—integrating functionality into the MSC or adding a trunk-side adjunct—involves the MSC in the delivery of service. Since the new service is expected to spur demand, integrating new services via MSC design changes or through trunk-side adjuncts is likely to exacerbate network congestion at the MSC and require costly MSC resources.

With respect to the Internet, multicast communication refers to the transmission of identical data packets to selected, multiple destinations on an Internet protocol network. (In contrast, broadcast communication refers to the indiscriminate transmission of data packets to all destinations, and unicast communication refers to the transmission of data packets to a single destination.)

Each participant in a multicast receives information transmitted by any other participant in the multicast. Users connected to the network who are not participants in a particular multicast do not receive the information transmitted by the participants of the multicast. In this way, the multicast communication uses only the network components (e.g., switches and trunks) actually needed for the multicast transmission.

In multicast processing, when a potential participant ("host") is directed to join a particular IP multicast group, the host sends a "request to join" message to the nearest multicast-capable router to request to join the multicast group and receive information sent to this group. For example, a host A sends a message to join multicast group Y, and a host B sends a message to join multicast group X. A router R propagates the request up to the multicast source if the data path is not already in place.

Upon receiving an IP packet for group X, for example, the router R maps an IP multicast group address into an Ethernet multicast address, and sends the resultant Ethernet packet to the appropriate switch or switches.

According to the current Internet Group Management Protocol ("IGMP") a host's membership in a multicast group expires when the router does not receive a periodic membership report from the host.

With respect to interaction among MSs, a Nextel service (known as Nextel Direct 10 Connect®, using Specialized Mobile Radio technology, and described at http://www.nextel.com/phone_services/directconnect.shtml) having two versions has been proposed for special connection calls among MSs. Both versions of the special connection calls require that all members be located in the same area served by one BSC. In the first version, a one to one conversation is allowed between two mobile telephone subscribers, e.g., A and B. When A wishes to have special connection communication with B, A enters B's private identification number, holds down a push to talk ("PTT") button, waits for an audible alert signifying that B is ready to receive, and starts speaking. To listen, A releases the PTT button. If B wishes to speak, B holds down the PTT button and waits for an audible confirmation that A is ready to receive. The service allows a subscriber to choose private identification numbers from scrollable lists displayed on mobile telephone handsets or to search a list of pre-stored names of subscribers.

In the second version, conversations are allowed among members of a pre-defined group of subscribers, known as a Talkgroup, which is identified by a number. The mobile telephone handset allows Talkgroup numbers to be searched through the control surface of the handset. In order to place a group call, the initiating subscriber, e.g., A, locates a Talkgroup number in the handset, holds down the PTT button, and, upon receiving an audible confirmation such as a chirp, can start speaking. All of the other Talkgroup members on the group call can only listen while A is holding down the PTT button. If A releases the PTT button, another member on the group call may hold down the PTT button, acquire control signaled by the audible confirmation, and start speaking.

SUMMARY

The invention generally provides systems and methods of mobile communication and specifically provides a system and method for group calling. Information is retrieved from a list of members of a group call group. Based on the retrieved information, a group call is established between first and second mobile stations (MS). The first MS is served by a first base station controller (BSC) and the second MS is served by a second BSC. Voice data for the group call is transmitted in a multicast session. Based on a history of group calls between two points in a mobile communications network, a determination is made as to whether to establish a multicast session between the two points, e.g., in anticipation of a future group call.

By initiating a single call, a member of a group can cause a group call to be established among all members of the group who can be contacted. Group calls can be established among members that may be located in different areas served by different BSCs and perhaps by different access methods (e.g., TDMA or CDMA). The inter-BSC voice traffic among the members in a group call may be carried by an alternative communication network such as an Internet Protocol network.

DETAILED DESCRIPTION

Figure 1:
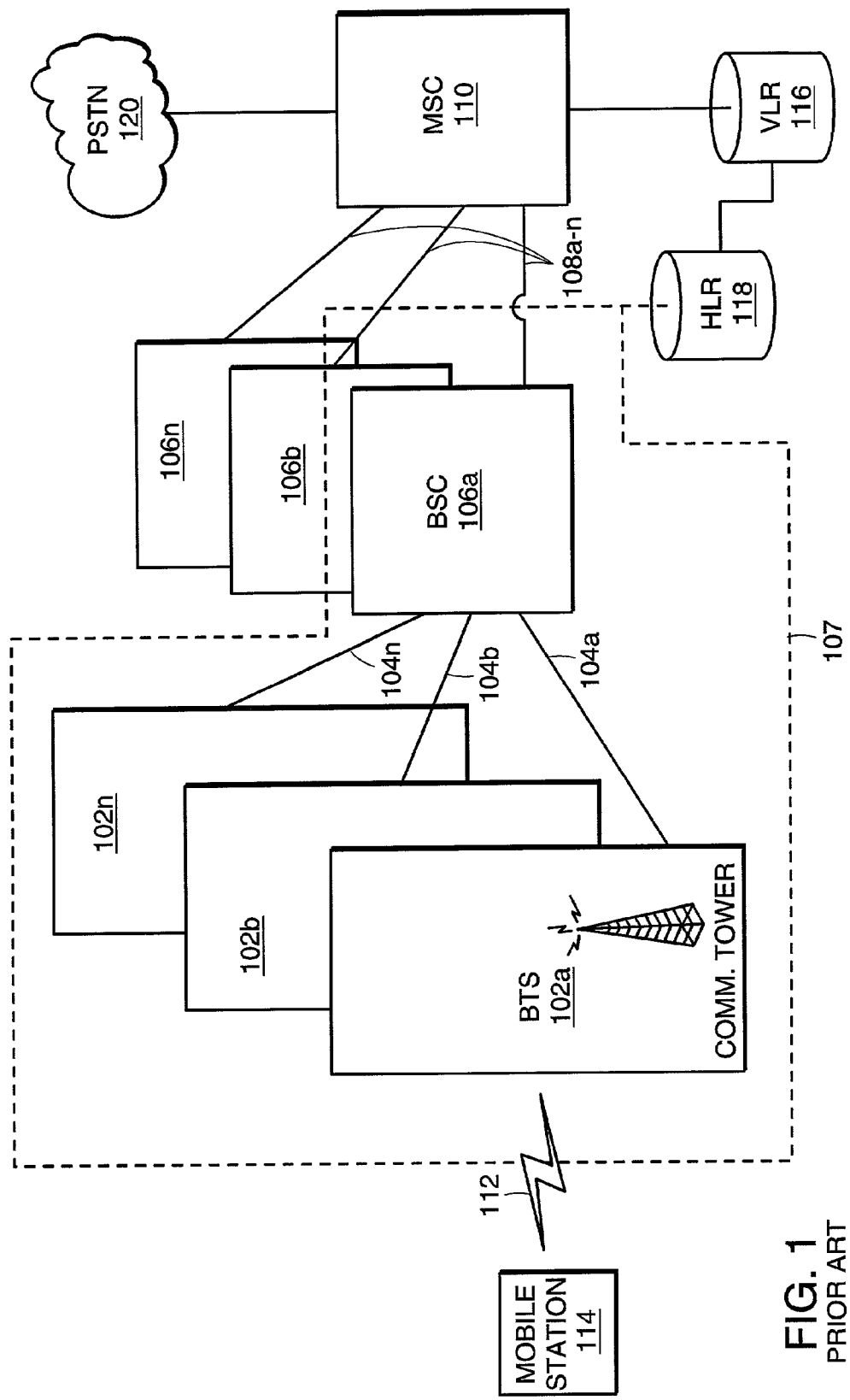
FIG. 1 is a system diagram of prior art mobile networks.
Figure 2:
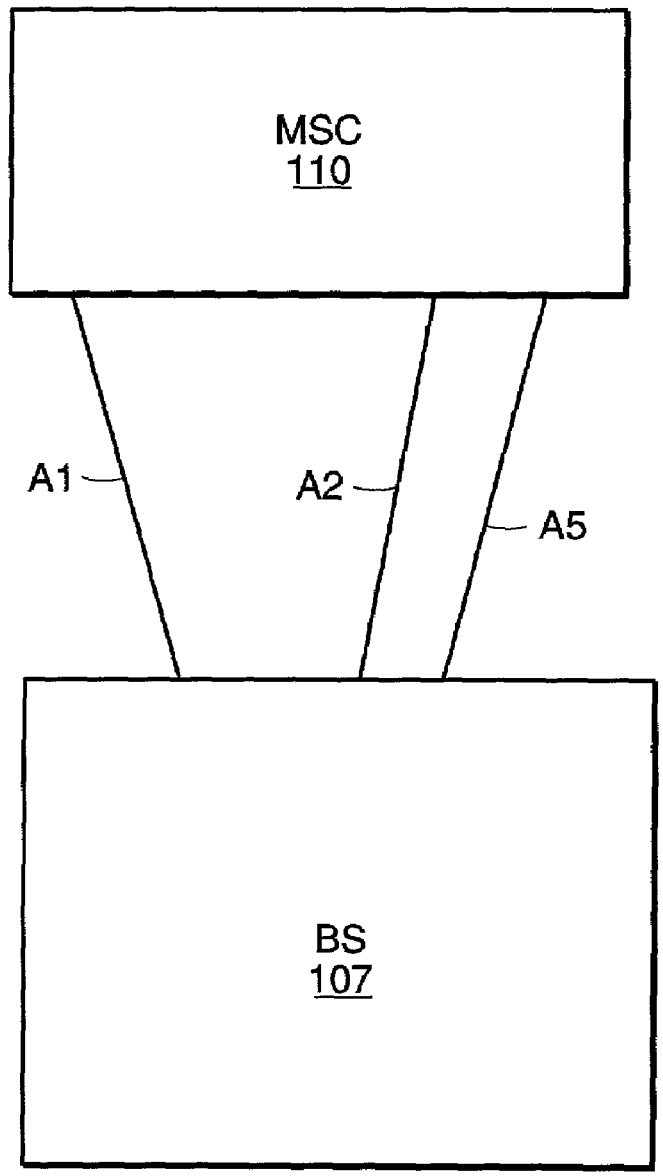
FIG. 2 illustrates a prior art interface between a BS and a mobile switching center in a prior art mobile network.
Figure 3:
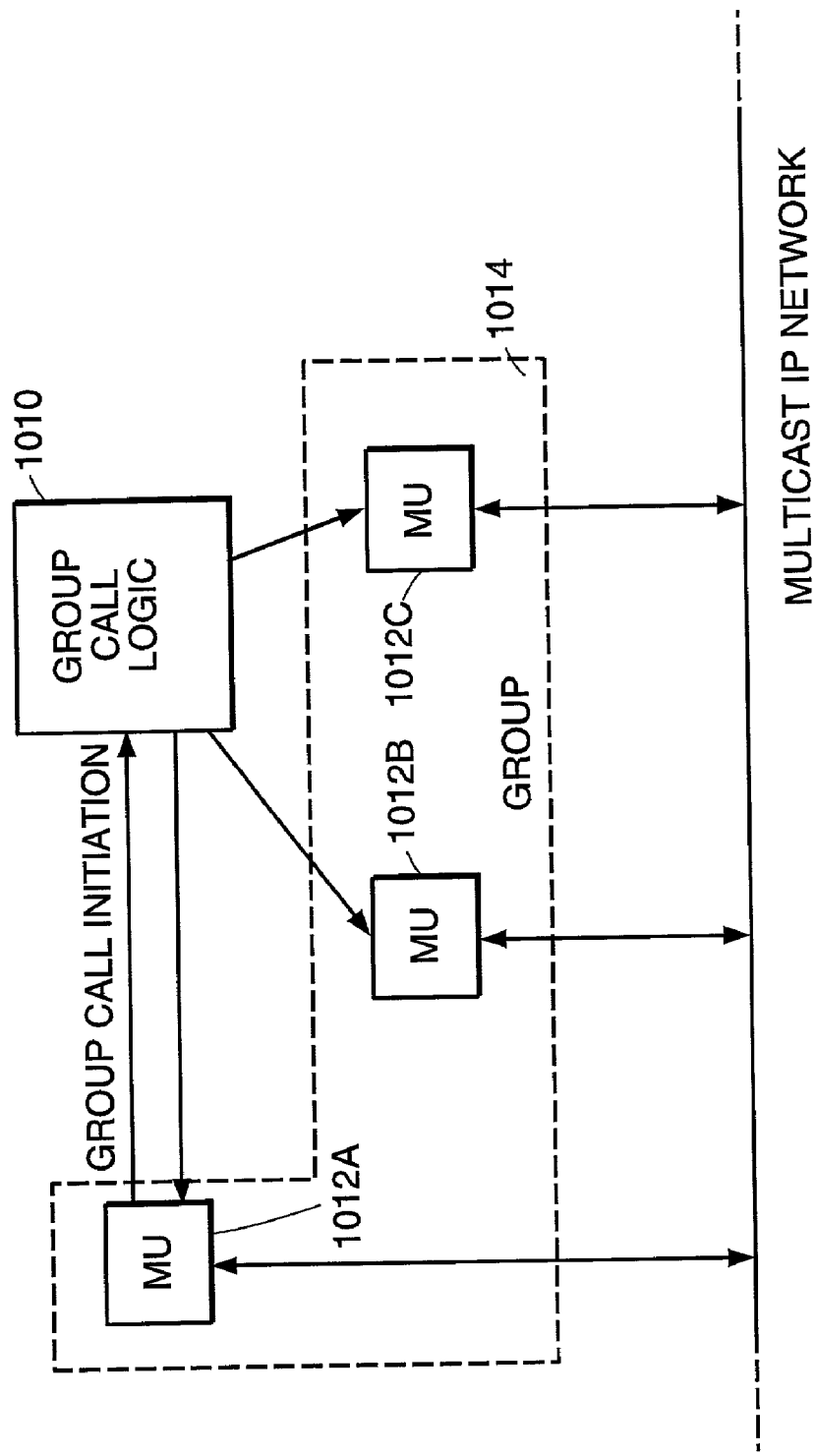
FIG. 3 illustrates a block diagram of a system including group call logic.

With reference to FIG. 3, a system and method is provided for arranging calls among members of a predefined group of mobile telephone users. As described in more detail below, a proxy switch or other device implementing group call logic 1010 detects a group call initiation by a member 1012A of a group 1014 and automatically attempts to connect all of the members 1012A, 1012B, 1012C of the group in a group call. In a specific implementation, communication in the group call is half duplex (i.e., only one member may speak at a time), and the voice traffic for the group is carried over an Internet Protocol ("IP") network in a multicast session.

Figure 4:
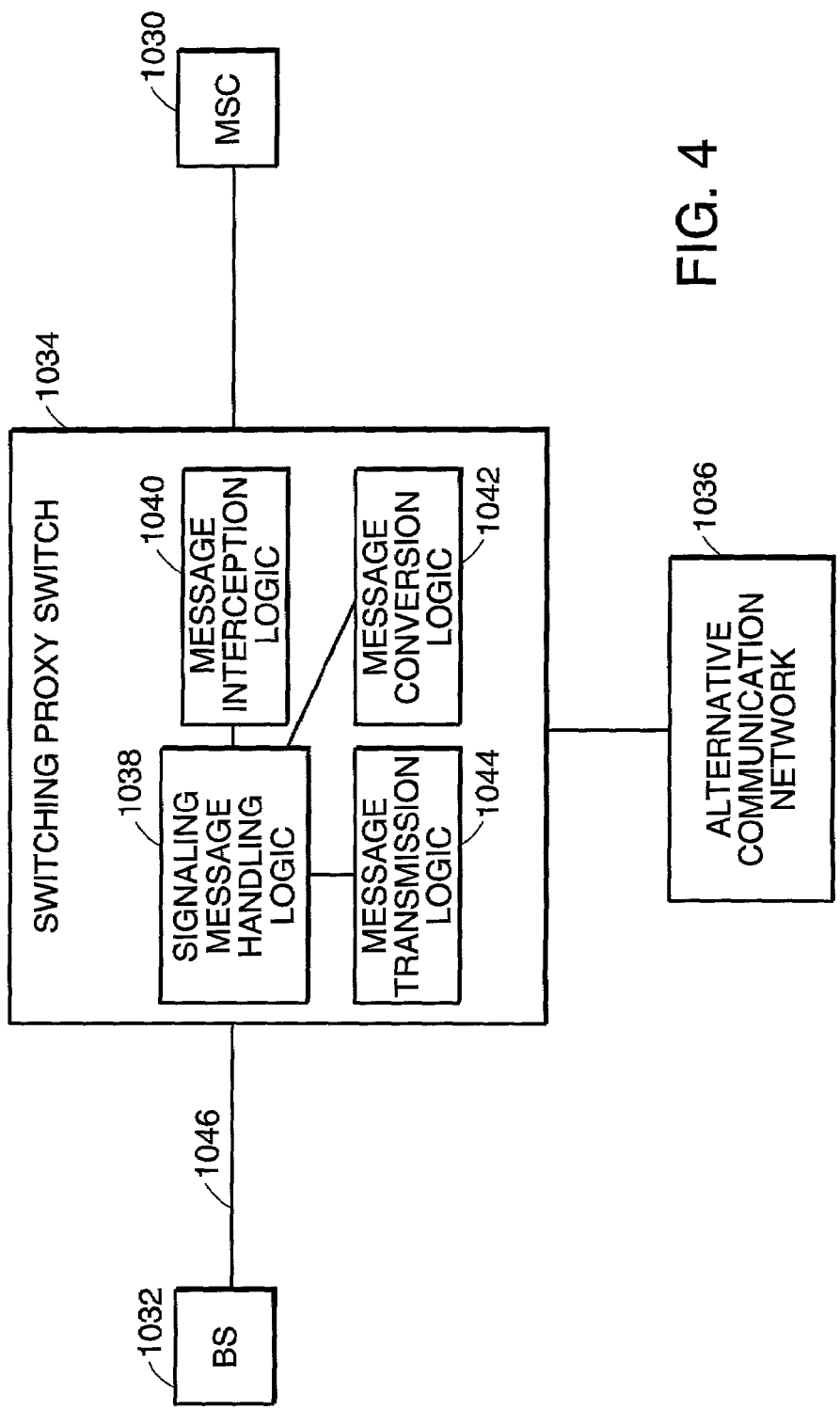
FIGS. 4–5 illustrate a proxy switch and certain deployments in a mobile network.

With respect to the case in which the group call logic is implemented by a proxy switch, the proxy switch may operate as described in copending U.S. application Ser. No. 09/721,329, entitled System and Method of Servicing Mobile Communications with a Proxy Switch, filed Nov. 22, 2000, which is incorporated herein by reference. As described in the copending application and illustrated in FIG. 4, switching 1034 operations are performed between at least one mobile switching center ("MSC") 1030 and at least one base station subsystem ("BS") 1032. The switching allows communication traffic to be siphoned to or from an alternative network 1036 such as an IP network. The switching is transparent so that neither the MSC nor the BS needs any changes to work with the inventive switching.

The proxy switch described the copending application includes signaling message handling logic 1038 to receive signaling messages from the MSC and BS in accordance with a mobile signaling protocol. Message interception logic 1040 cooperates with the signaling message handling logic and sends an acknowledgment message to an MSC or BS that transmitted a signaling message. The message interception logic also prevents the signaling messages from being forwarded to the other of the BS and MSC respectively. Message conversion logic 1042 cooperates with the signaling message handling logic and converts a signaling message from one of the MSC and BS into a converted signaling message for transmission to the other of the BS and MSC, respectively. Message transmission logic 1044 cooperates with the signaling message handling logic and transmits signaling messages from one of the MSC and the BS to the other of the BS and MSC, respectively.

A set of bearer circuits 1046 from the BS are allocated to the proxy switch. Signaling messages between the MSC and the BS are received and are analyzed to determine whether they correspond to the allocated set of bearer circuits. If so, control information in the signaling messages is conveyed to the alternative communication network; and information carried on the set of bearer circuits is siphoned to the alternative network.

Figure 5:
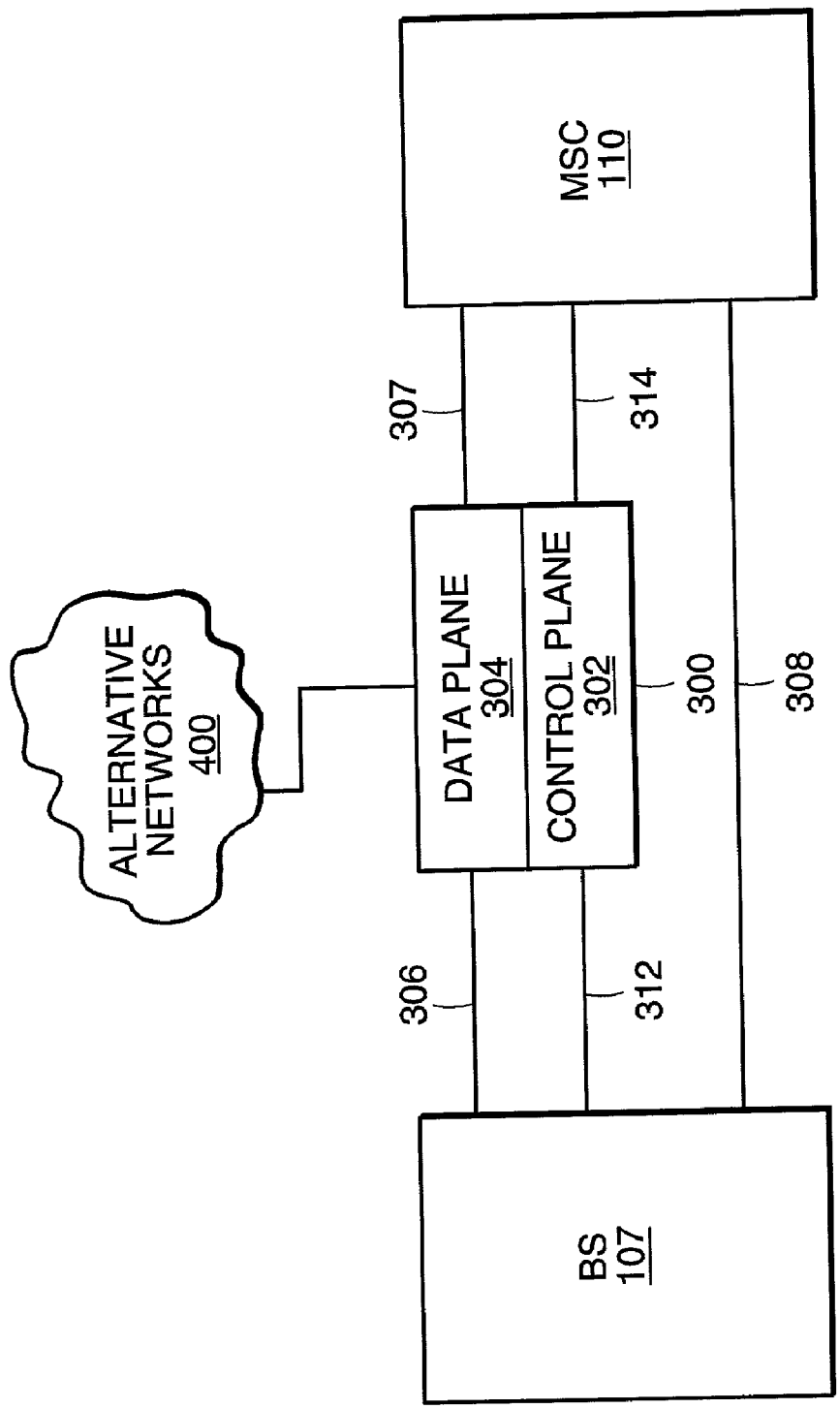

FIG. 5 shows one preferred deployment of a proxy switch 300, in which the proxy switch 300 is positioned between the BS 107 and the MSC 110. Only a subset of trunks 306 carrying user traffic needs to be terminated on the proxy switch; other trunks 308 may directly connect the MSC 110 and BS 107. All control links 312 from BS 107 terminate at proxy switch 300. The proxy switch includes a control plane 302 and a data plane 304 (also known as a "bearer plane"). The control plane 302 handles all the signaling traffic, and the data plane 304 handles all the user traffic for the trunks connected to the proxy switch.

Under certain embodiments, there is a one to one correspondence between an MSC and a proxy switch. Several BSs may work with a single proxy switch.

The proxy switch 300 includes software that accepts all signaling messages and, depending on the message and the state of the system, performs at least one of the following:
1. passes the message unaltered to the MSC or BS addressed in the message;
2. intercepts messages between the MSC and BS;
3. for some intercepted messages, converts the intercepted messages to a different message and sends the converted message in place of the original, intercepted message to the MSC or BS addressed in the intercepted message;
4. siphons the message from the mobile- and PSTN-based network to an alternative network such as an IP network.

The types of actions performed in each case along with the triggering events are described below.

In many instances, particularly when a message from an MS 114 is siphoned and the traffic is directed to an alternative network, the proxy switch 300 may act as an MSC 110. In such a role, the proxy switch fulfills the responsibilities and roles that a traditional MSC would perform. Some of these functions and roles pertain to mobility management. Consider the case of a roaming MS; as it roams from one cell to another, it may roam to a cell served by a different MSC, thus necessitating a handoff between the source and target MSCs. If the proxy switch 300 has siphoned the message and the call/session has been directed to an alternative network, then the handoff is managed by the proxy switch analogously to the way a handoff would be managed by a conventional MSC. The proxy switch causes the appropriate databases to be updated with the new location of the MS.

Another function of the proxy switch pertains to the assignment of resources. In particular, when an MS initiates a message requesting a new call/session, appropriate circuits (channels) need to be assigned for this session. Depending on the configuration of the system and the system state, the proxy switch makes such assignments analogously to the way conventional MSC assigns circuits.

Figure 6:
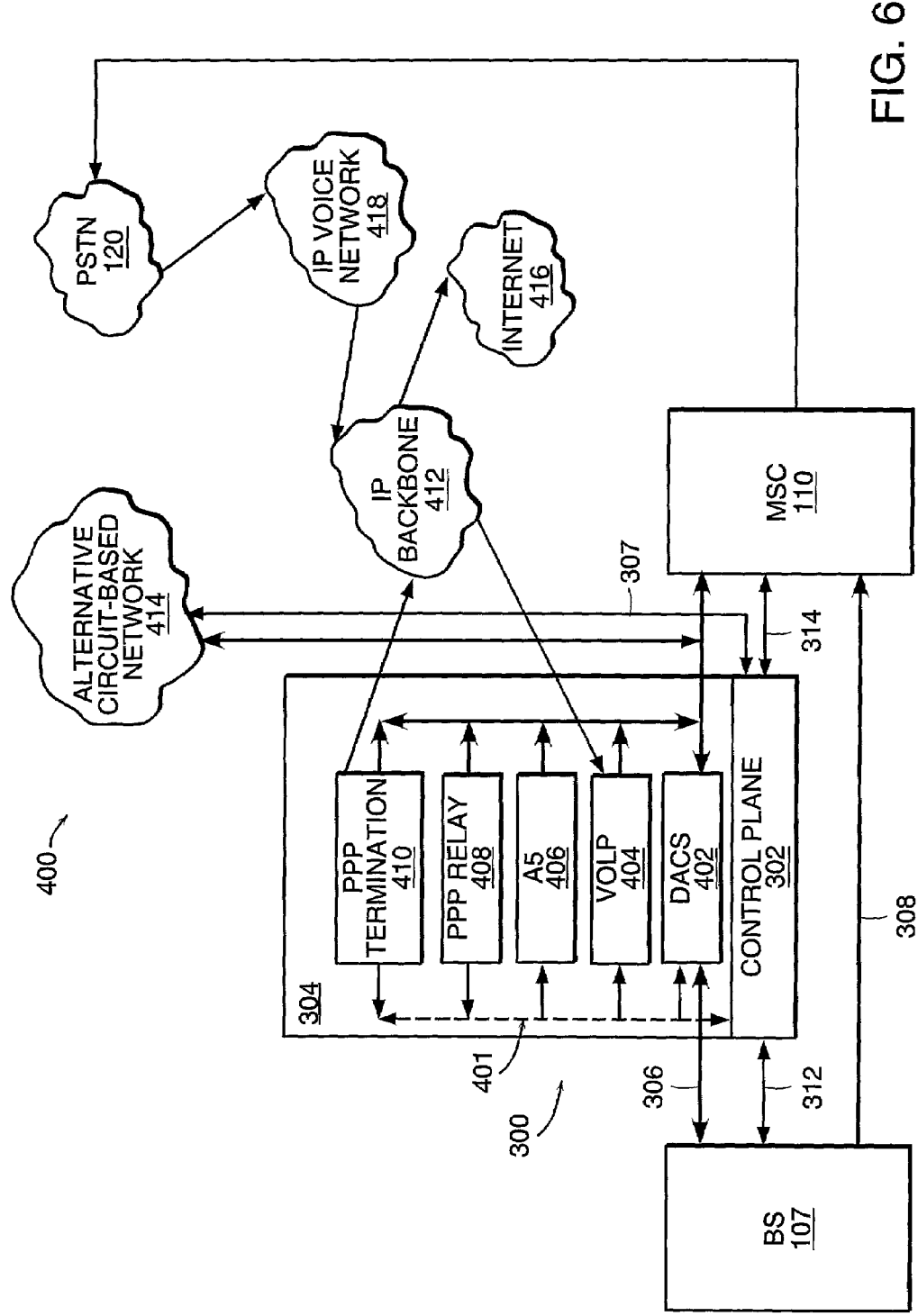
FIG. 6 illustrates an exemplary data plane of a proxy switch according to a preferred embodiment of the invention.

FIG. 6 shows an exemplary deployment in which the proxy switch 300 is connected to several alternative networks, such as an IP backbone 412 or an alternative circuit-based network 414, e.g., a different carrier. These alternative networks may be used to carry voice and/or data traffic to desired destinations while avoiding in whole or in part the PSTN 120 along with the costly resources of MSC 110. Alternatively, these arrangements may be used so that circuit traffic could be backhauled to a different network; for example, circuit traffic from Nashua, N.H. could be backhauled to an MSC in Waltham Mass. Or, they may be used to connect to other networks. For example, the IP backbone 412 may communicate with IP voice networks 418 or the Internet 416. As explained in the copending application, when siphoning traffic to an alternative network both control information (e.g., from the signaling messages) and voice or data from the bearer circuits on links 306 may be sent via an alternative network.

In a specific implementation of the group communication system introduced above, mobile communications users ("users") belonging to a closed user group ("group" or "CUG") are provided with an ability to contact each other quickly and easily and thereby start conversing with each other. Each group includes two or more users ("members"), and a user may belong to multiple CUGs. Conversations may occur between two members of a group ("private mode") or between all available members of a CUG ("public mode"). The group communication system uses conventional mobile communications equipment such as cellular telephones and mobile PDAs.

In a specific implementation, the group communication system implements group call logic in proxy switches logically disposed between MSCs and BSCs as described above to intercept group call initiations, bypass the MSCs and the PSTN, and implement the group calls as IP multicast sessions performing Voice over IP ("VoIP"). The users in a group may be served in disparate geographical locations by multiple MSCs spanning an aggregate network that relies one or more on wireless technologies such as CDMA, TDMA (including IS-136 and GSM), GPRS, and third generation technologies. For example, among the group members joined on any one group call, one or more users may be roaming in a GSM network simultaneously with one or more users roaming in a CDMA network. Control information pertaining to a group call can be made available for one or more users such as display participants in the group call while the group call is in progress. Group call lists may be dynamically created and modified by the group call user, using standard numbering schemes such as MIN, IMSI, and ESN.

Figure 7:
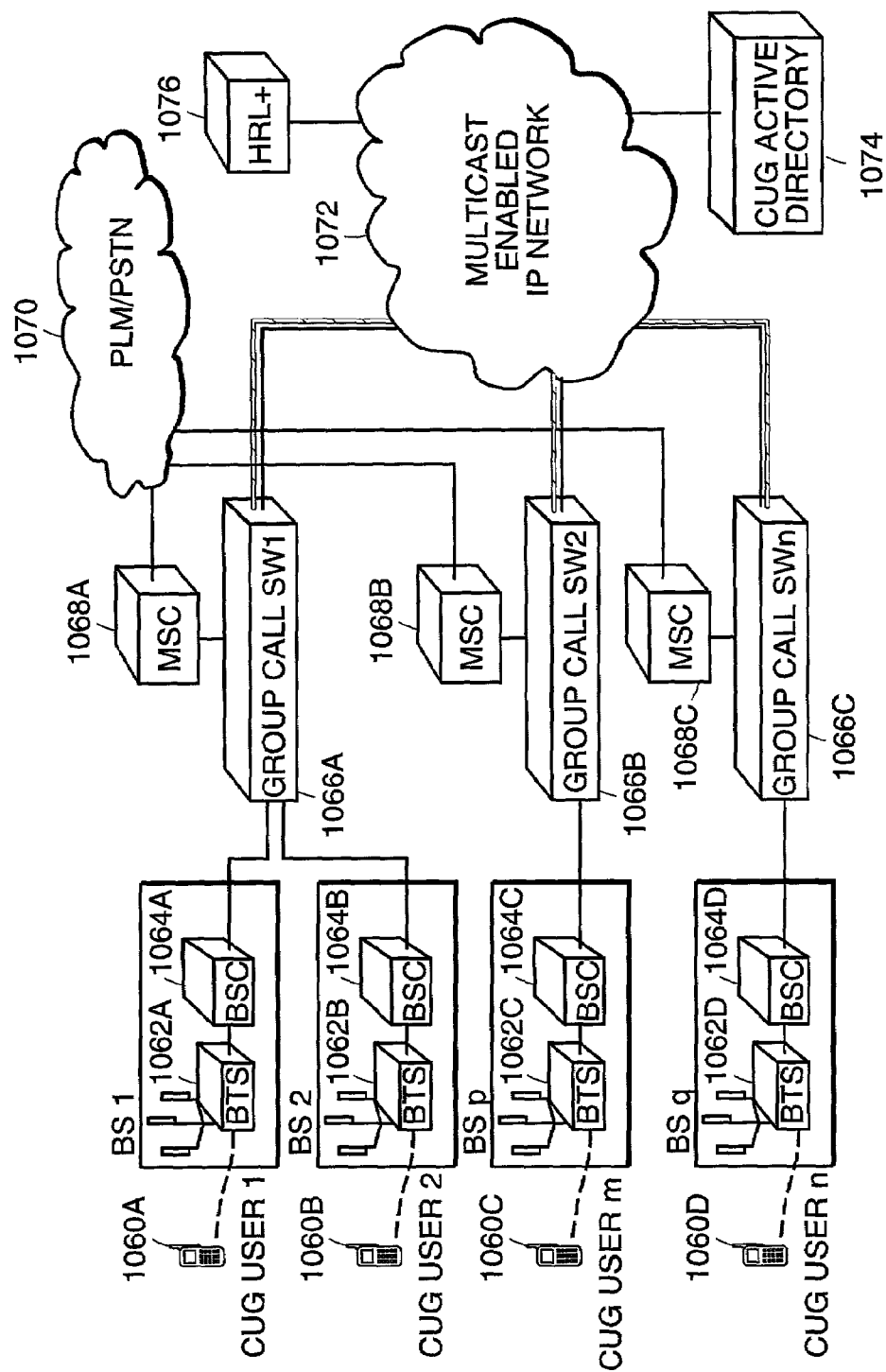
FIGS. 7, 9, 16–17 illustrate architectures of a group communication system.

The general architecture for an example embodiment of the group communication system is shown by example in FIG. 7. FIG. 7 shows four users in a group call using wireless devices 1060A–1060D connected to different BTS systems 1062A–1062D. For the purposes of the following description, it is assumed that the wireless devices have both audio and textual display capabilities. The BTSs are connected to Base Station Controllers ("BSCs") 1064A–1064D, which are connected to proxy switches implementing group call logic ("group call switches") 1066A–1066C. Each group call switch is connected to an MSC such as MSC 1068A, 1068B, or 1068C. At least one group call switch is provided for every MSC in a group call service enabled network. With respect to signaling information, each group call switch is logically located between a corresponding BSC and a corresponding MSC. The group call switch receives signaling and data from the MSC and in the reverse direction from the wireless devices via the BTS and the BSC. Each group call switch operates such that neither the BSC nor the MSC is made aware of the group call switch that lies between the BSC and the MSC. The signaling and control information from the MSC and the BSC is intercepted by the group call switch and is seamlessly passed on to the concerned elements as necessary without any discernible change.

The MSCs connect to the Public Land Mobile Network ("PLMN") 1070 and the group call switches connect to a backbone multicast enabled IP network ("backbone network") 1072, which provides access to a CUG Active Directory 1074 and an Enhanced Home Location Register ("HLR") 1076.

As described above with respect to the proxy switch of the copending application, the group call switch includes a control plane and a data plane. The functions at the control plane are the termination of the signaling messages from the BSC or the MSC or both. For example, in CDMA networks the signaling messages are defined by the IS-634 protocol specification. The control plane terminates the incoming signals and generates new signaling messages for onward transmission to the MSC or other elements. The control plane also supports a multicast function described below.

In one particular embodiment, the data plane of the group call switch receives TDM traffic from the BSC or the MSC or both and uses a TDM cross connect ("DACS") (FIG. 5) to interface the incoming traffic to an outgoing destination.

In other embodiments, the data plane may also receive incoming IP traffic from the Base Station complex (also known as the Radio Access Network, or "RAN"), and switch the incoming IP traffic to outgoing IP traffic. Programmatic control in the control plane determines cross connections between incoming TDM traffic and outgoing destinations, particularly the traditional MSC and/or destinations on an IP network.

In the case of the MSC serving as the outgoing destination from the DACS, the group call switch is essentially transparent to the network; traffic and control flows seamlessly from the BSC to the MSC and from the MSC to the BSC. When the outgoing destination is instead on an IP network, a Media Gateway (described in the copending application) in the data plane diverts selected parts of the incoming TDM traffic away from the MSC and converts incoming TDM traffic to RTP/UD/IP traffic and inserts the RTP/UD/IP traffic into the backbone IP network.

Figure 15:
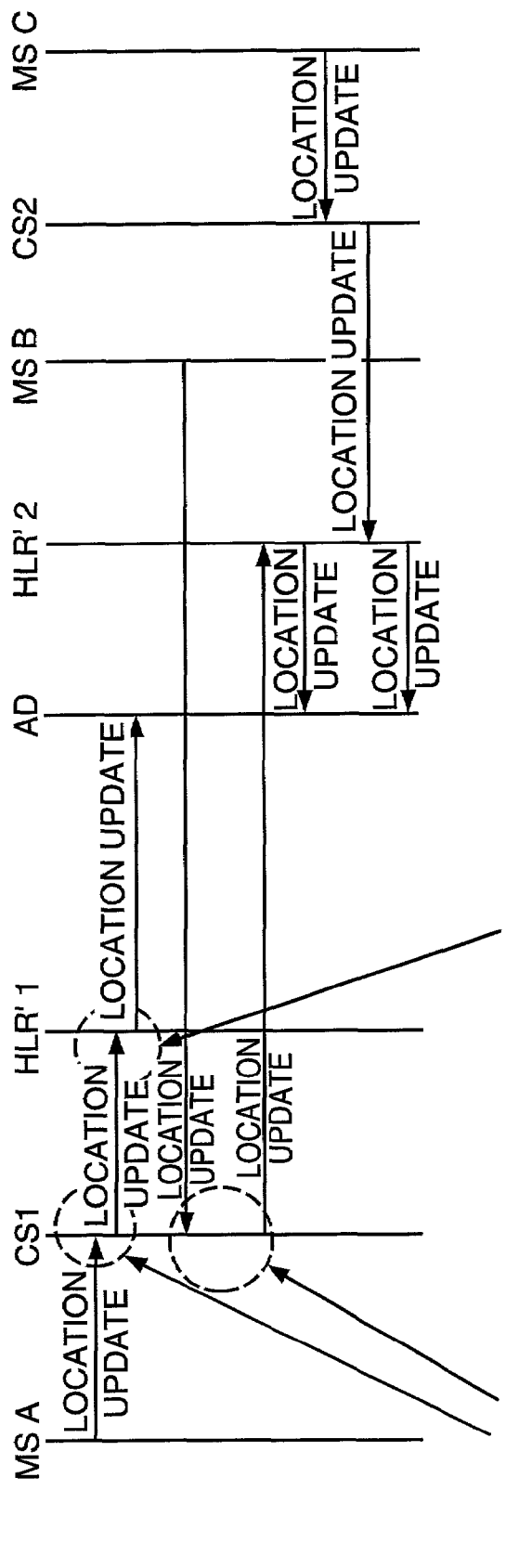

The CUG Active Directory ("CUG AD") 1074, also known as the Group Call Registry ("GCR"), is a database system containing the CUG data. In a specific implementation, CUG AD in FIG. 15 is implemented as a distributed database system for scalability. The CUG AD contains the definitions of all the CUGs in the group call network. An inquiry to the CUG AD specifies the identifier of a CUG, i.e., the inquiry asks for the definition of a specified CUG, and the result is a list of group user IDs for all the members of the specified CUG. For example, an inquiry specifying CUG ID 2347 may cause the CUG AD to produce a result that identifies Mobile Identification Numbers ("MINs") xxx, yyy, zzz, and www for the four users in the CUG. In a specific implementation, MIN numbers are assigned to the users of the GIR service by the service provider.

Each CUG is identified to the system by a unique identifier ID derived from a CUG namespace which is partitioned such that different partitions are assigned to different, distributed parts of the CUG AD. A partitioning index of the partitioning scheme is made available to all the group call switches. When a group call switch needs to retrieve the definition of a CUG, the group call switch can use the index to determine the component of the CUG AD to be queried.

The Enhanced HLR 1076 is an enhanced version of the standard HLR database ("standard HLR ") used in cellular telephony. A standard HLR fields location updates from roaming mobile users. The traditional path traversed by these updates is from the mobile telephone to the BTS, from the BTS to the BSC and then onto the MSC, which sends an update message to the HLR. In a specific implementation of the group call network, the group call switch is located between the BSC and the MSC, which renders all location updates visible to the group call switch. For users who have subscribed to the group call service, the group call switch intercepts location update messages and replicates them to the HLR'. In addition to thereby storing the cellular location of the group call users, HLR' also stores a listing of all the CUGs to which each group call user belongs. A query to HLR' specifies a MIN identifying a group call user and produces a response that includes is a list of the CUGs in which the group call user is a member.

In a specific implementation, HLR' is a distributed database in which the distribution of the data is based on the MIN hierarchy. Alternatively, HLR' could also be based on International Mobile Subscriber ID ("IMSI") or Equipment Serial Number ("ESN"). An index similar to the partitioning index described above for the CUG namespace allows a group call switch to determine the HLR' partition to be queried when an incoming request is to be processed.

In the following example for a family, a CUG may be defined as having users Dad, Mom, and Teenager, each of whom carries a cellular telephone. By pressing a special sequence of keys on his cellular telephone (or a special key if provided on the telephone), Dad can cause execution of a group call initiation process that locates Mom and Teenager and invites Mom and Teenager to join a group call. In the half duplex implementation described below, when the group communication system confirms that at least one member of the CUG has joined the group call, Dad as the initiating joined member is assigned speaking control and can start speaking while the other joined member or members listen. When Dad relinquishes speaking control, any of the other joined members of the CUG (e.g., Teenager if Teenager has joined the call) can gain speaking control and speak. Thus, in the half duplex implementation, only the joined member who has been assigned speaking control can speak; another joined member cannot speak until speaking control is relinquished and re-assigned. As described in detail below, to request speaking control, a user on a group call may press a standard number key on the telephone, may press a special key if provided by the telephone manufacturer, or may send a text message to the current speaker requesting to speak next, if the telephones have text messaging capability. If at some point during the call speaking control remains unassigned for a predetermined period of time (i.e., the conversation is done), the call is terminated.

A group call can be arranged when all members of a CUG are in the same switching area, i.e., in a geographical area controlled by a single MSC or proxy switch, or are in different switching areas. For example, in the case of a CUG having users A, B, C and D, A and B may currently be roaming in switching area S1, C in switching area S2, and D in switching area S3. If the S1, S2, S3, and S4 switching areas are either all operated by the same service provider or are administered by operators who have agreed to cooperate with each other to offer group call service, a group call can be established that connects A, B, C and D. If so, the individuals may be widely dispersed with respect to physical location, e.g., A and B may be in Boston, C may be in Texas, and D may be in California.

The group communication system provides interoperability of calls across heterogeneous network technologies, i.e., allows a group call to be established regardless of whether members of a CUG are roaming across networks that are based on different technologies. For example, user A may be in Boston roaming in a Code Division Multiple Access ("CDMA") based network while B is roaming in the United Kingdom ("UK") in a Global System for Mobile Communications ("GSM") based network (GSM uses Time Division Multiple Access ("TDMA") technology). If A and B belong to the same CUG and the CDMA and GSM operators have agreed to cooperate in offering the group call service, a group call can be established between A and B.

The system may include one or more of the following enhancements, which are described in more detail below. As is apparent from the description above, a group call can be established regardless of whether all of the members of a CUG are joined to the call. If some members of a CUG cannot be joined on a group call, an exception list listing the missing members may be generated and recorded by the system. If one or more members of the CUG have telephones having display screens, the exception list may be displayed on the display screens. Further actions may be taken based on the exception list. For example, during or after the call, a voicemail message may be sent to the members listed in the exception list; for instance, the voicemail message may be recorded once by the call initiator and may be delivered by the group communication system to voicemail boxes at previously specified voicemail telephone numbers for the members on the exception list. Instead or in addition, the CUG members joined to a particular group call may be listed on the available display screens of the telephones of all the joined members during the call, to make each joined member aware of which other members are on the call. A visual indication may be provided on the available display screens to identify the member who currently has speaking control.

A private call may be established by a user of the group communication system with another user of the group communication system, so that the users can discuss confidential or personal information outside of a group call. Thus, two participants in an ongoing group call may temporarily engage in a private call and then return to the ongoing group call.

A user of the group communication system may request a listing of group calls in progress ("active group calls") for CUGs in which the user is a member, and join one of such calls. A user of the group communication system may initiate or join a public group call, i.e., a group call for a CUG that includes every user of the group communication system. An operator may define any number of public user groups ("PUGs"). Each user of the group communication system is automatically made a member of all PUGs. To join an active public group call, the user requests a listing of active public group calls and selects a call in which to participate.

If a user of the group communication system has call waiting capability, the user can place a group call on hold and answer an incoming call signal. A user who does not want to accept any incoming call signals, including for group calls, may activate call forwarding or call blocking. A user may elect to block only incoming call signals for group calls, for private calls, or for both.

The group communication system may incorporate speech-to-text translations in group calls for the benefit of users who are in a noisy environment, users in public places where audible telephone use is restricted, and hearing impaired users, and may incorporate language translations (e.g., from English to French).

A user of the group communication system may be contacted using the user's mobile telephone number or a special group communication system identification number ("group user ID") that the service provider may assign during group service sign-up based on contact information that is stored in the user's telephone phone directory. Group user IDs may be self set up ("self-provisioned") instead or in addition using a Web-based provisioning system as described below.

As noted above, the group communication system provides three modes of operation: Closed User Group ("CUG") mode, Private mode, and Public User Group ("PUG") mode. Except in the case of user controlled calls as described below, the user presses a number key (or special telephone key if provided) to talk, and waits to hear a tone indicating that the user has been granted speaking control. When the user is finished talking, the user may press a key, which causes the other joined users to hear a tone indicating that speaking control is available. Another joined user may then press a key, hear a tone, and begin talking. The initiator starts with speaking control after at least one other user has joined the call as indicated by a tone. The call ends when all joined users have hung up or when no one has requested speaking control for a period of time, as noted above. The system resolves conflicts arbitrarily between simultaneous requests from users for speaking control. For example, a "human protocol" may be used if a full duplex mode for conversations is available. In such a case, control can be passed to multiple users, such that eventually all but one user become silent, and speaking control is transferred to that non-silent user.

In CUG mode, group call users form a Closed User Group by creating a unique group ID for a list and assigning members to the list using the members' group call IDs and their mobile telephone numbers. Inasmuch as the handsets are to be signaled by the Radio Access Network ("RAN") under the direction of the proxy switch, and since the RAN uses mobile telephone numbers to effectuate such signaling, the CUG information includes mobile telephone numbers. Each CUG includes two or more users, optionally with a maximum size imposed by the service provider.

In a specific implementation, if the group call user wants to contact a group of users in the user's community (i.e., CUG mode), the user keys in ("enters") a call initiation sequence, e.g., *4 followed by the CUG ID, and presses the send key. (The call initiation sequence may also be stored in and dialed from the speed dialing directory of the user's telephone.) A member of the CUG who is not able to join the call when first notified can join the call later, if the call is still active, by entering the call initiation sequence and pressing the send key.

In CUG mode, the call initiator has the option of requesting a user controlled call, which is a call having a "barge-in" capability. According to the barge-in capability, a listening user may send an alert message to the speaking user by pressing a service configurable DTMF sequence of keys, to indicate to the speaking user that the listening user would like to assume speaking control. At that point, the speaking user may press a key to relinquish speaking control, or may continue to talk. Accordingly, the barge-in capability provides the speaking user with an audible notification of a listening user's desire to speak, and, in the case of a telephone having a text display, may also provide a text message displaying the name of the listening user who sent the barge-in message. Thus, the speaking user is not forced to guess that a listening user would like to speak. When the speaking user wants no interruptions (e.g., during an announcement to a large group of people), the barge-in capability may be disabled.

As described above, CUG mode may also provide an attendance reporting with speaker identification capability and an attendance exception with broadcast capability.

Call transcription capability may be provided in CUG mode such that speech-to-text technology is used to transcribe a group call in real time. A group member who has a text display telephone and is notified of the group call can request to mute the call and receive a text transcription instead. In a specific embodiment, a non text display telephone sends and receives audio only and a text only device such as text pager receives text, and if the call transcription capability is not turned on, text only devices are not notified of the group call. A full transcription of the call may be available at the end of the call, and may be sent to all members of the CUG, CUG members who did not join the call (based on an attendance exception list), or the call originator. The capability may be extended to translation services, using the preferred language indicator available with IS-41-C. The preferred language indicator is an information element included in the profile of the subscriber and stored in the HLR database, to indicate a preference of the subscriber with respect to the language in which announcements and other reports should be presented. The switch uses the preferred language indicator when playing pre-stored announcements. Additional resources such as human or automated translator may be provided by the service provider.

Group call IDs and the associated list of members may be set up using a Web based provisioning application from a personal computer, or from a WAP enabled device. The user may also set up a list from the user's mobile telephone. The service provider specifies the limit to the number of members on a list, the network or networks to which the members belong, and the number of lists that a group call user may maintain.

In private mode, the group call user may quickly invoke a call to any member of the user's group that is connected to a group call enabled network by entering the group call initiation sequence, e.g., *4 followed by the group call ID of the intended recipient member, and pressing send. The intended recipient member is notified of a call from the user and, in a specific embodiment, the user hears a chirp when the intended recipient member has answered the call.

In PUG mode, the group call user may view a list of current chat groups and decide to join a chat group. The group call user may create a new chat group that is available to any group call user, by specifying a unique group call ID, and providing a brief text description of the subject of the group. The subscriber may optionally associate a text name with the group call ID, as long as the text name is unique across the current active chat groups.

The group call feature does not take precedence over existing mobile telephone features such as call forwarding, do not disturb, and call blocking. Callers on a group call are able to switch to an incoming call if call waiting is enabled. Three way calling, call conferencing, and call transfer are disabled during a group call for security reasons, and are re-enabled at the culmination of the group call.

The group call service supports conversation encryption using the IS-41-C Voice Privacy ("VP") feature, as requested by the mobile telephone, if the corresponding base station supports VP.

In a specific implementation described in more detail below, the group call service operates in the IP network using IP multicast. As described above, IP multicast allows a source to send a single copy of a stream of VoIP packets which is received by multiple recipients who have explicitly registered to receive the stream. Multicast is a receiver-based concept such that receivers join a particular multicast session group and the stream is delivered to all members of that group by the network infrastructure. Only one copy of a multicast stream is passed over any link in the IP network, and copies are made only at IP multicast enabled media gateways as necessary.

In the wireless network, the service has some characteristics of any conventional wireless call. As described above, the group call initiator invokes a group call by sending a DTMF feature escape sequence followed by the ID of the group call list of users the initiator wants to contact (e.g., "*4" followed by the user group ID). The feature escape sequence is used by the proxy switch to detect that the call is a group call and queries the Global Call Registry ("GCR" or "CUG AD") to retrieve the list of mobile telephones to contact and their current locations. The current location information determines which Media Gateways and BSCs are to be involved in the group call. Bearer channels are established between each such BSC and the corresponding Media Gateway via the group call switch data plane. The group call is presented to each BSC as having conventional point-to-point call set-up and tear down characteristics, and is not presented to the MSC.

Figure 8A:
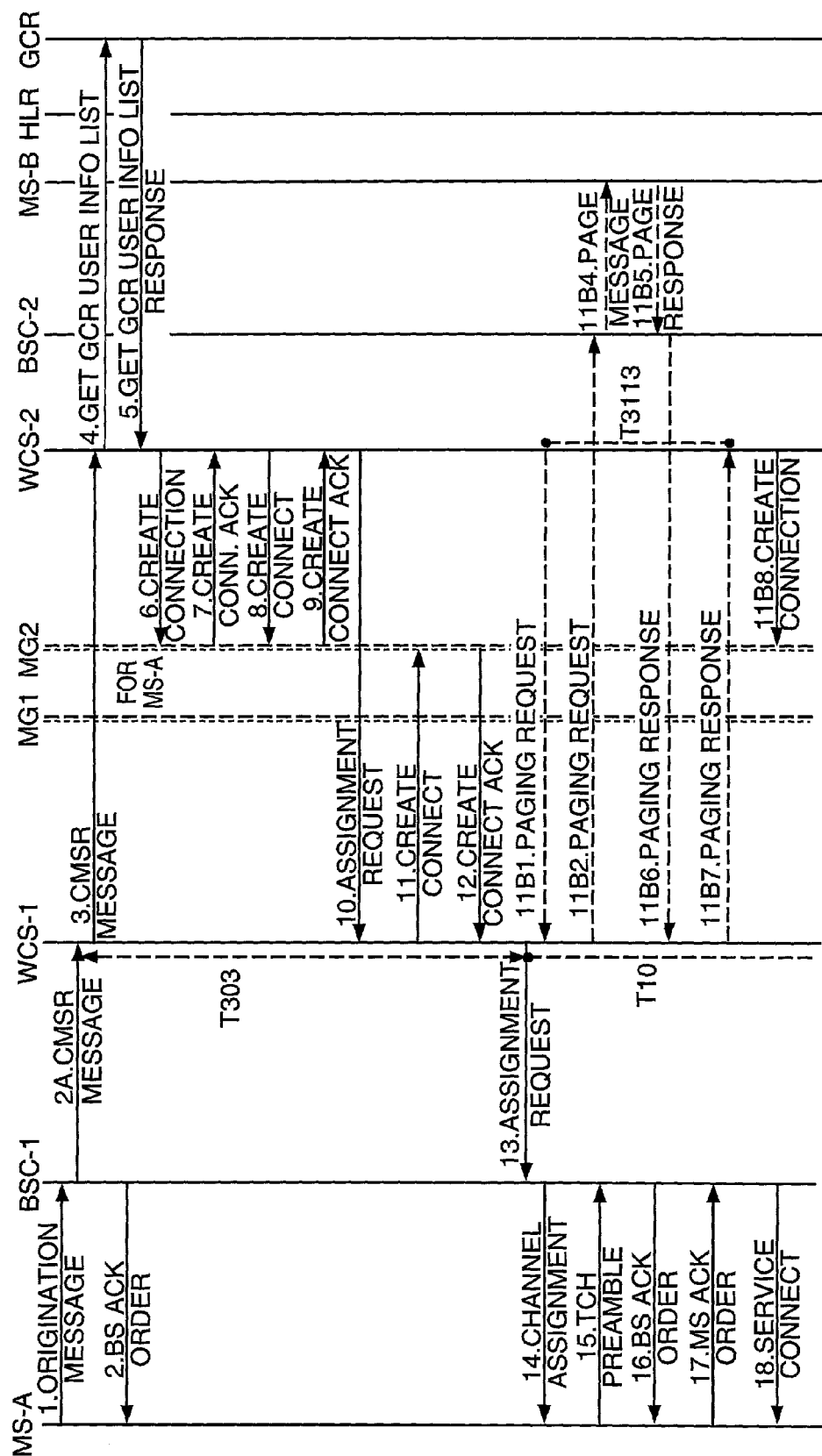
FIGS. 8A–8C, 11–15 are call flow diagrams of uses of a group communication system.
Figure 8B:
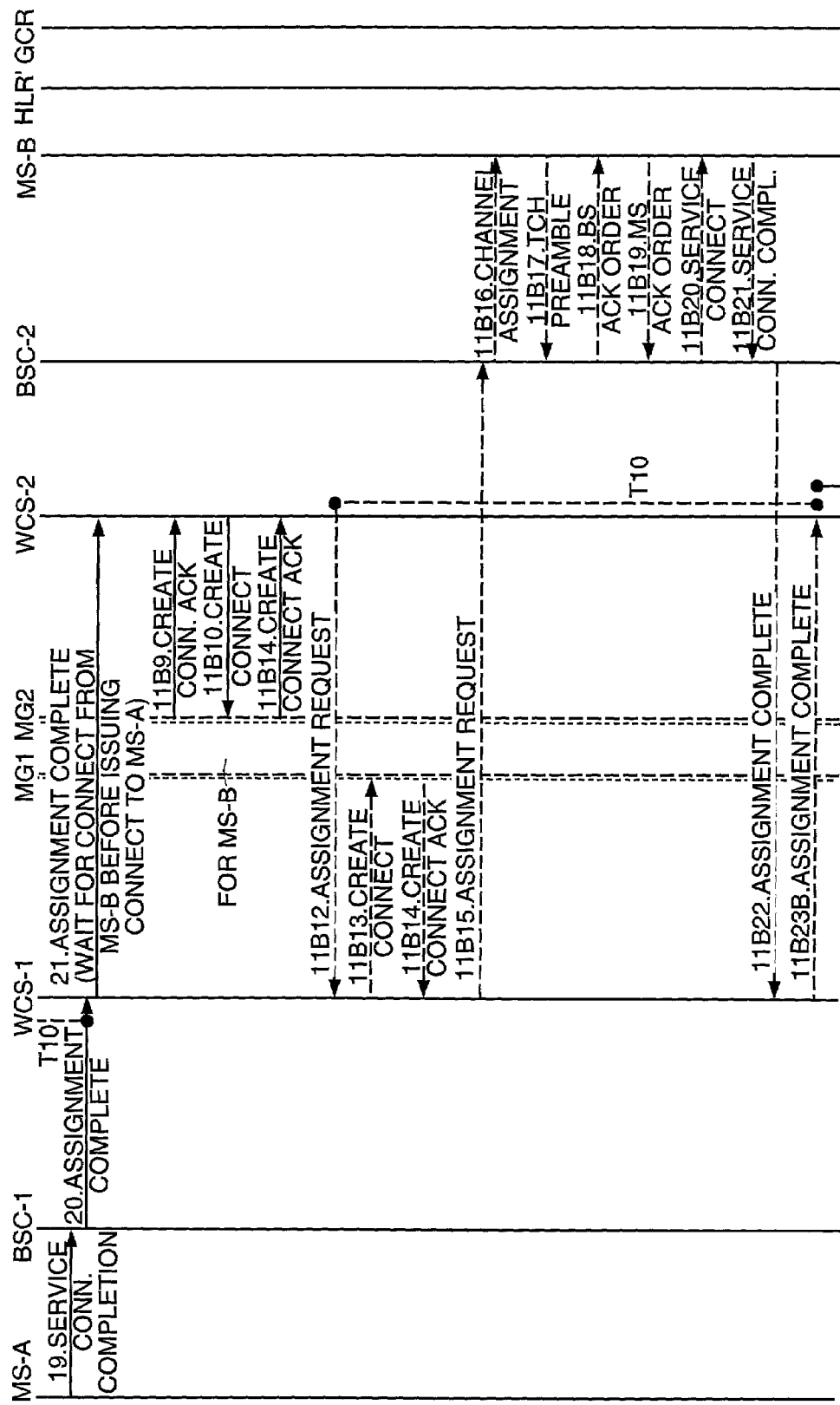
Figure 8C:
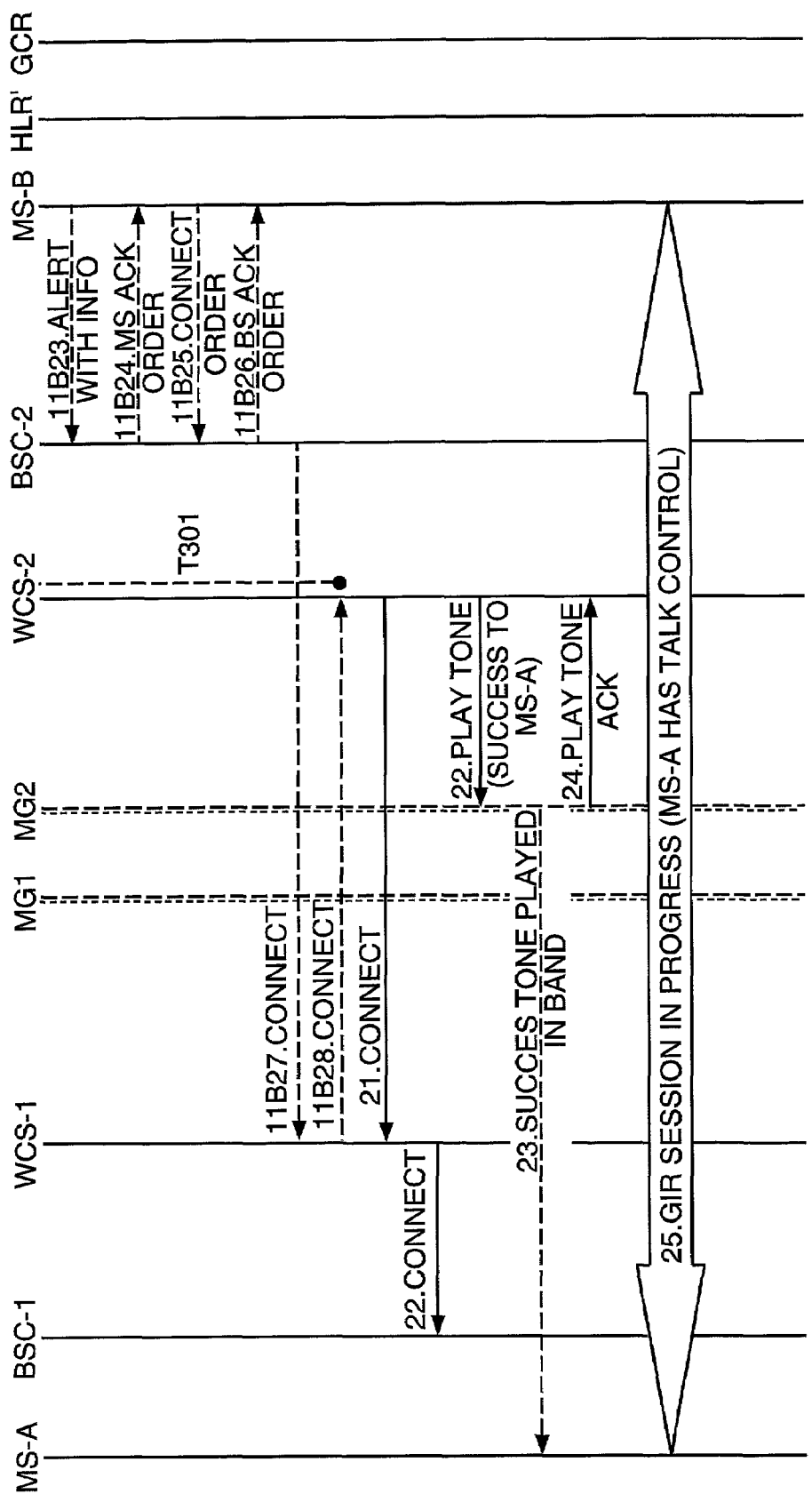
Figure 9:
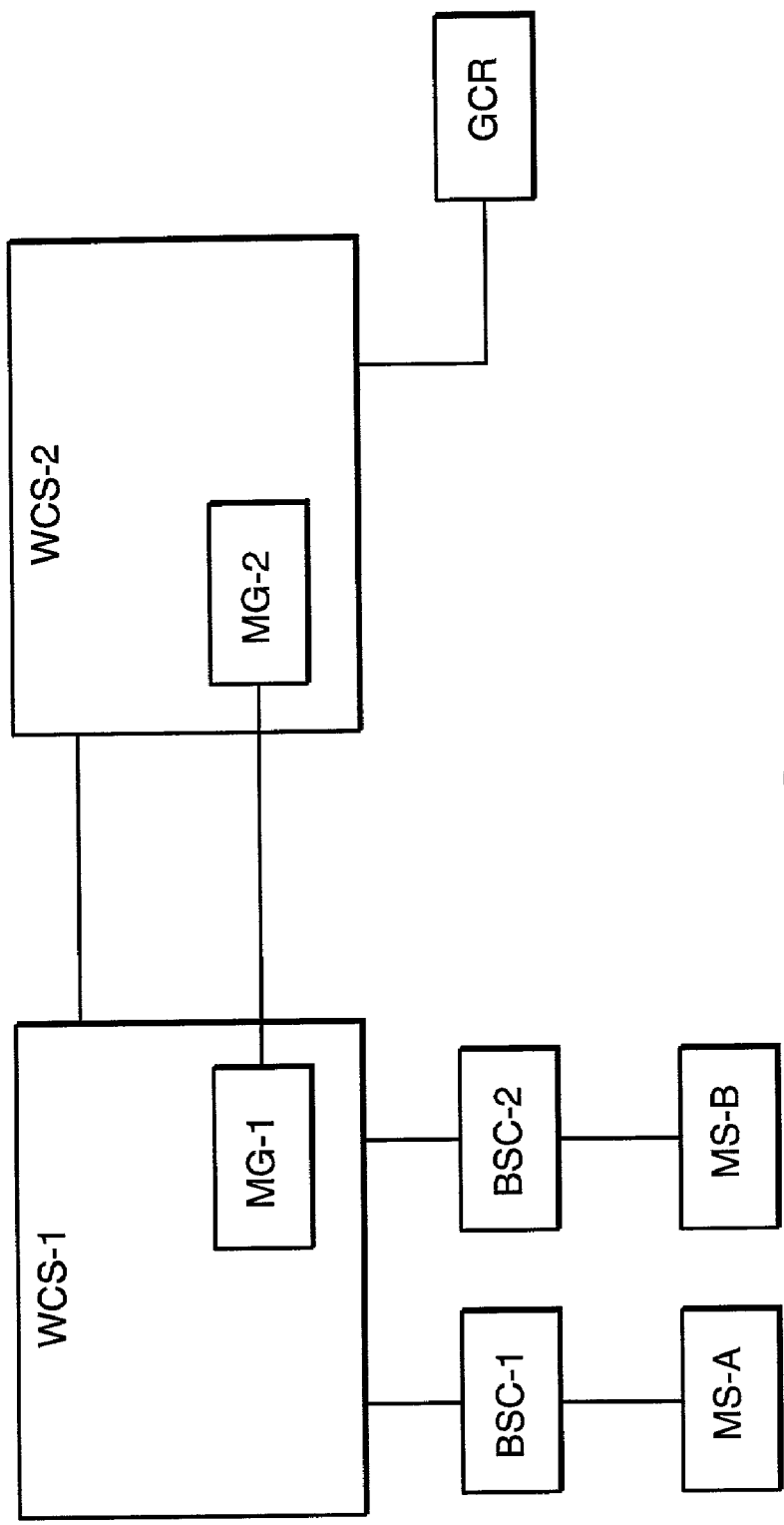
Figure 10:
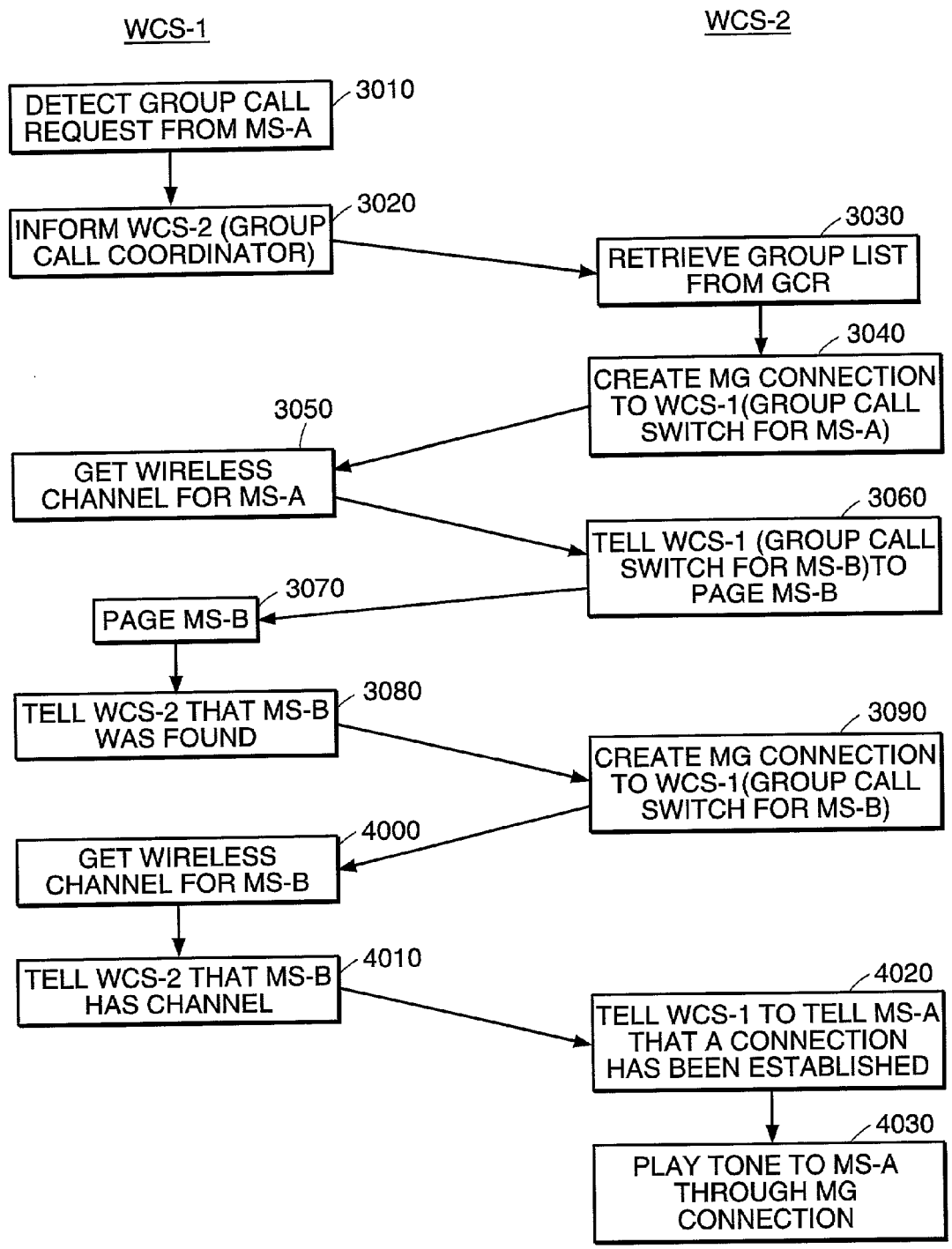
FIG. 10 illustrates a flow diagram of group call logic.

An example call flow diagram for the basic service, within the wireless network, is shown in FIGS. 8A–8C, wherein WCS-1 and WCS-2 represent group call switches. With reference to FIGS. 9–10 as well, the principal entities in the flow diagram are group call switches WCS-1, WCS-2 having respective media gateways MG1, MG2; a GCR that is accessible by WCS-2; BSCs BSC-1, BSC-2; and mobile stations (e.g., telephones) MS-A, MS-B. In the example, MS-A and MS-B happen to be covered by the same group call switch WCS-1, but the procedure would be the same if MS-A and MS-B were covered by different group call switches.

FIG. 10 illustrates a group call logic flow diagram summarizing the call flow diagram of FIGS. 10A–10C for setting up a group call. The share of the logic handled by WCS-1 is shown on the left and the share of the logic handled by WCS-2 is shown on the right. WCS-1 detects that MS-A has requested a group call (step 3010) and so informs WCS-2 (the group call coordinator) (step 3020). WCS-2 refers to the GCR to determine the other members of MS-A's CUG and their last known locations (step 3030). (In this simple example, MS-B represents the only other member.) WCS-2 creates a Media Gateway connection to WCS-1 (the group call switch for MS-A) (step 3040). WCS-1 acquires a wireless channel for MS-A (step 3050). WCS-2 tells WCS-1 (the group call switch for MS-B) to page MS-B (step 3060). WCS-1 pages MS-B (step 3070) and then informs WCS-2 that MS-B was found (step 3080). WCS-2 creates a Media Gateway connection to WCS-1 (the group call switch for MS-B) (step 3090). WCS-1 acquires a wireless channel for MS-B (step 4000) and informs WCS-2 that the acquisition has been accomplished (step 4010). WCS-2 tells WCS-1 to indicate to MS-A that MS-B has been reached (step 4020) and then causes a tone to played to MS-A through the Media Gateways (step 4030).

Further call flow examples are explained below in connection with FIGS. 12–15.

Figure 11:
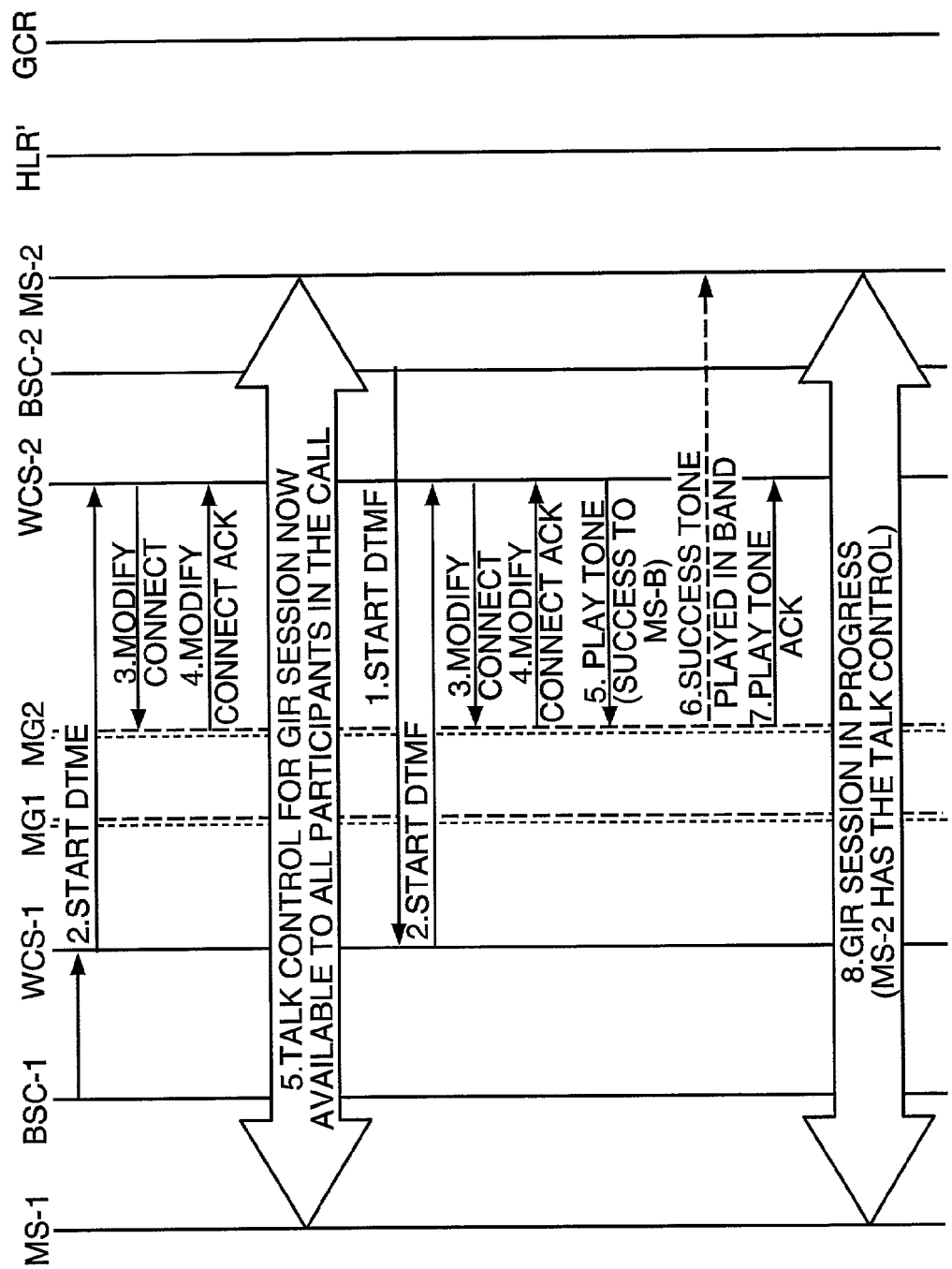

As described above, in group calls, only one joined user is permitted to speak at a time; a joined user having speaking control can relinquish such control sending a predefined DTMF digit (e.g., "1"), and another joined user may then request speaking control by sending a DTMF digit (e.g., "8"). The joined user who has speaking control hears a success tone played when the send path is established as depicted in FIG. 11.

Prior to the group call, a group call user may elect to enable or disable one or more of the following features described above: attendance exception reporting, attendance reporting, call transcription, and barge-in capability.

In the Web based set up system that is available to end users to establish their GCR lists, the Web server connects to the GCR over an IP link to enable real time updates of users' group call lists. The set up system supports both the WAP protocol as well as standard industry browsers.

Call logs are collected for all participants in a group call, for accounting and network engineering purposes.

Figure 12:
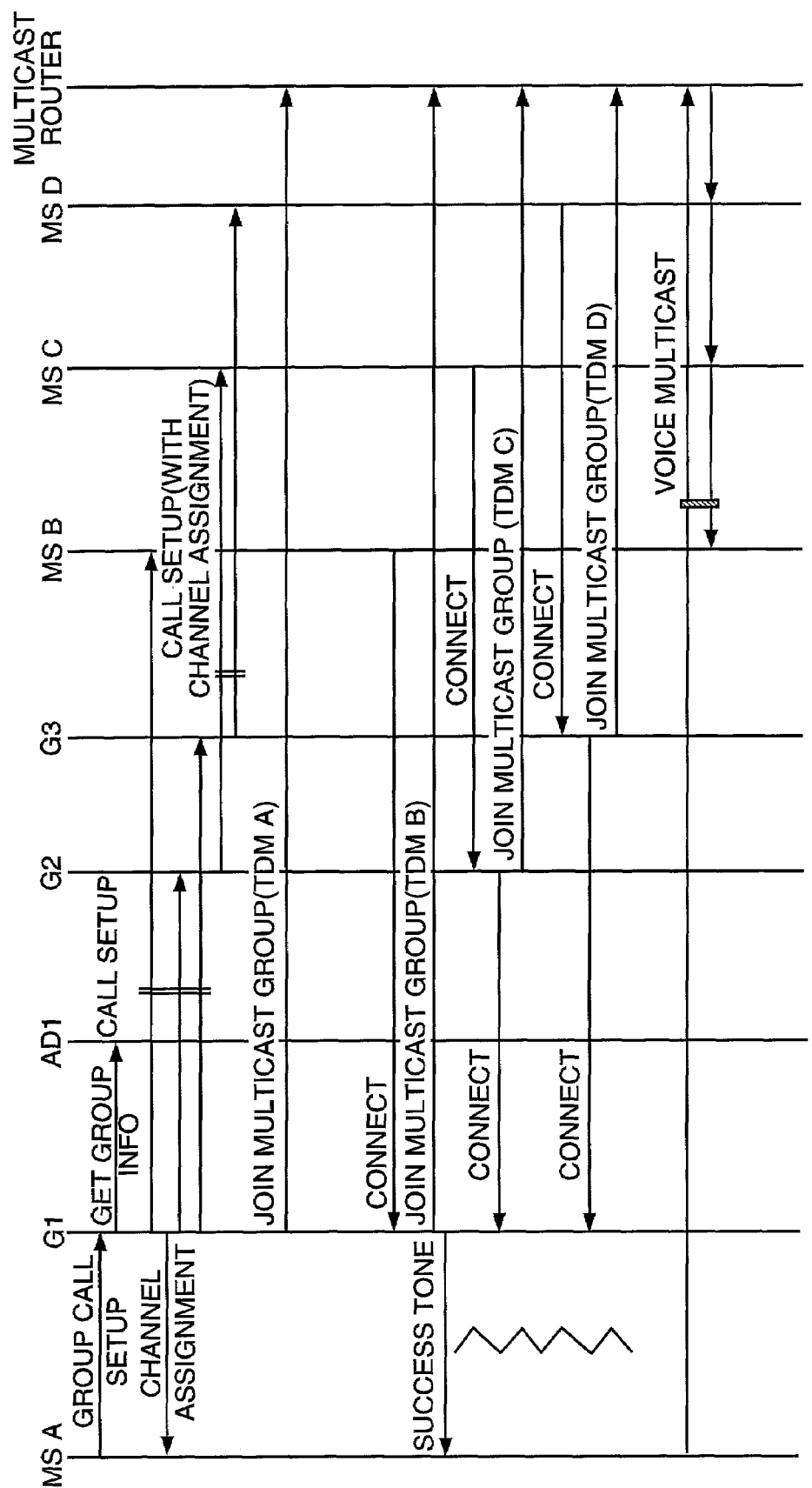

FIG. 12 illustrates an example, now described, of an application of the group call service. According to the example, CUG1 is a CUG having four users A, B, C, and D. Users A and B are currently served by group call switch G1, C is served by group call switch G2, and D is served by group call switch G3. The users have been assigned unique MINs by the group call service provider. For simplicity, the unique MINs are referred to as A, B, C, and D here. CUG1 has a unique identifier that is assigned by the service provider and that is represented here as CUG1. The definition of CUG1, i.e., the CUG1 membership list, is maintained in a distributed component of the CUG AD called AD1.

In a first example exercise, a group call is originated by A to group CUG1, i.e., to B, C, and D. FIG. 12 is a call flow diagram of the group call.

A originates a group call request for closed user group CUG1. In the IS634 interface, the request is represented as a CM_service_request with CUG1. In the case of the Radio Access Network ("RAN"), the request is much like any other call request. The IS634 commands and information elements involved include, among other information items, the calling number and the called number (e.g., assumed to be CUG1 in the current example). In at least some cases the RAN does not have the logic to distinguish valid numbering plans from invalid numbering plans, which logic may be implemented in the MSC. In such cases, the RAN forwards the number information as part of the IS634 message set to the MSC. Inasmuch as the proxy switch intercepts such messages, the number information becomes available to the proxy switch. Since the proxy switch can function in at least some ways as an MSC, the proxy switch can determine that an incoming call request is not a conventional call request, but rather a group call request for a closed user group. In such an instance, the proxy switch assumes the role of a group call switch and initiates procedures for a group call.

Group call switch G1 issues a channel assignment request back to A. G1 also initiates a directory transaction to retrieve the definition of group CUG1 from the CUG AD component AD1. The response from AD1 is expected to include the list of MINs corresponding to the members of group CUG1, i.e., B, C, and D. When the response is received, G1 has obtained the following information:

CUG1 includes of members B, C and D (in addition to A)
MIN B is the responsibility of switch G1 (i.e., itself)
MIN C is the responsibility of switch G2
MIN D is the responsibility of switch G3

G1 initiates a call set up request to B (which is the responsibility of G1 itself), and sends call setup requests to G2 and G3 for C and D, respectively. Thus, G2 and G3 act as proxy switches for G1 for this particular group call. G1 also ensures that a new context is created in which TDM traffic is directed from the RAN to the Media Gateway, which converts the TDM traffic to RTP/UDP/IP packets and sends the RTP/UDP/IP packets to a multicast router. The multicast router is instructed to receive the packets, add A to the multicast group, and multicast the packets to the specified multicast group. In the call flow diagram of FIG. 18, the instructions are shown collectively as "Join Multicast Group (TDM A)".

G1 then awaits connect messages from B, G2, and G3. Any of these three messages could be received in any order, and it is possible that only a subset of them is received. In the example, G1 first receives a connect message from B, followed by connect message from G2 and G3. Upon receiving the connect message from B, G1 sends a "Join Multicast Group (TDM B)" message which causes the Media Gateway to accept RTP/UDP/IP traffic from the multicast router, convert the RTP/UDP/IP traffic to TDM, and send the TDM to switch G1 which will cause the TDM to be transmitted via the BSC and BTS to B. The multicast router is instructed to add B to the current multicast group. Thus, for purposes of the current group call, switch G1 serves as a source of TDM traffic and switch G2 serves as a sink for TDM traffic.

In the example, C sends a connect message to G2 (i.e., the switch that is responsible for C) which in turn sends a connect message to G1. G1 then sends a "Join Multicast Group (TDM C)" message causing C to be joined to the group call in RECEIVE mode. Similarly, the connect message from D to G3 is relayed to G1 which causes D to added to the multicast group.

The Media Gateway is instructed by the control plane to receive or send packets at certain RTP ports only in a particular context. Packets are multicast by the router to the members of the multicast group.

Since, at this juncture, G1 has received at least one confirmation of a user that has joined the group call, G1 sends a success tone to A indicating that the group call may now proceed. A is in SEND mode and B, C, and D are in RECEIVE mode, and the multicast router can perform a multicast to B, C and D.

Figure 13:
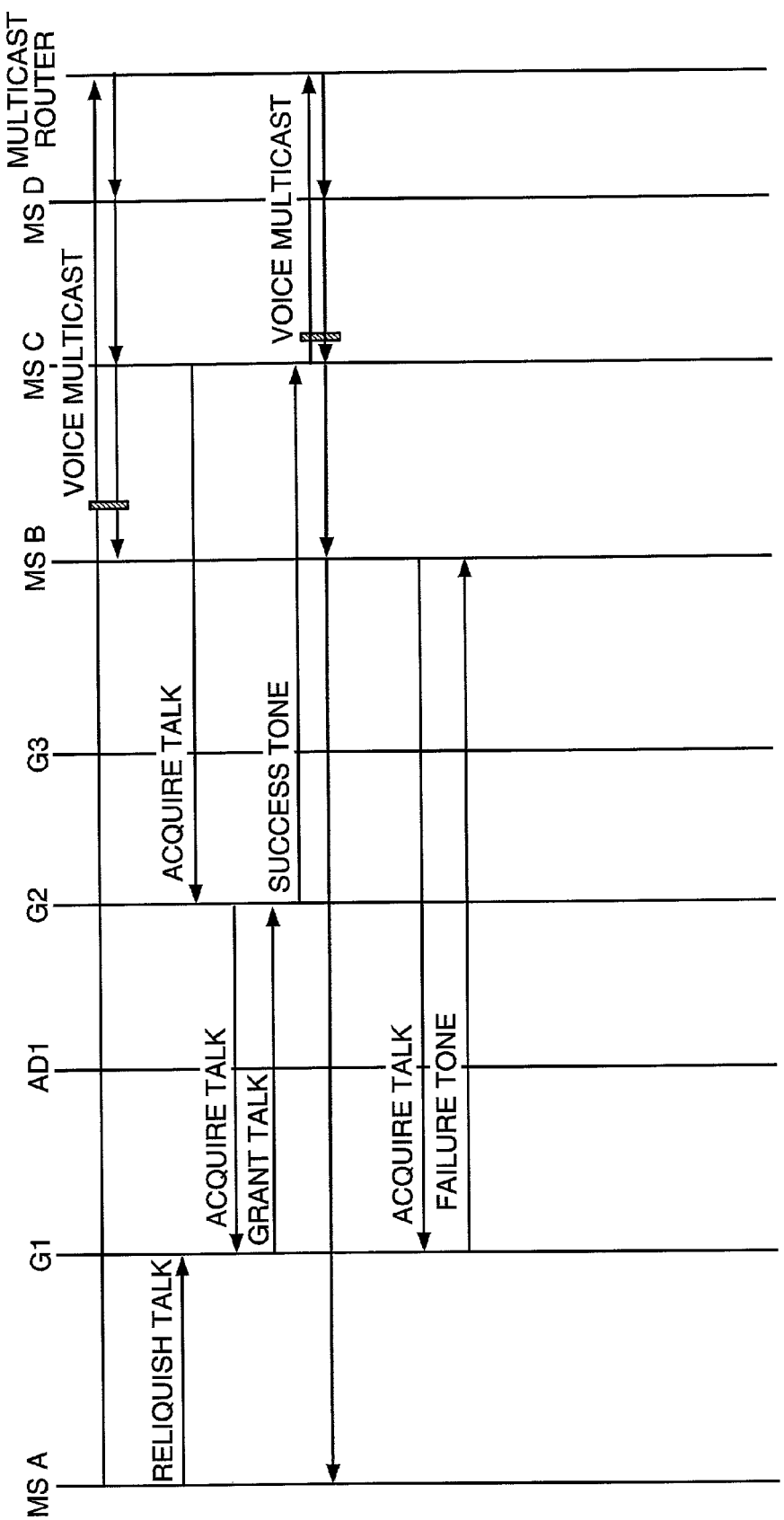
Figure 14:
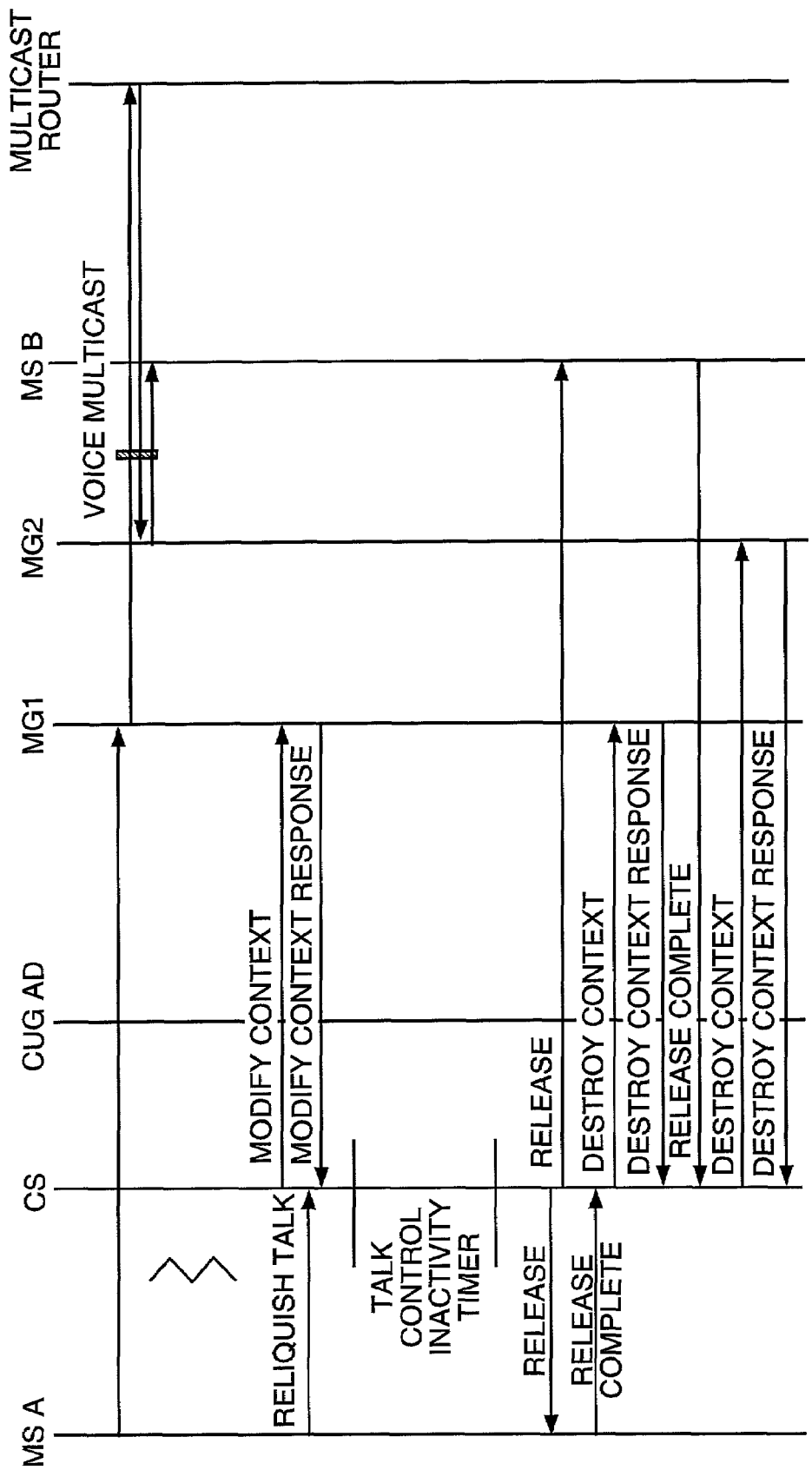

In another example exercise, a transfer of speaking control is performed, as illustrated in the call flow diagram of FIG. 13. Specifically, A relinquishes speaking control which is acquired by C.

To relinquish speaking control, A signals G1 which causes G1 to put the current group call in INACTIVE mode. (As explained above, if no user acquires speaking control within a specified time as measured by a system timer, the group call is terminated.) C issues an Acquire Talk command to its responsible switch G2. Since, for the purposes of the current group call, switches G2 and G3 are proxies for G1 which is the controlling switch, the Acquire Talk command is relayed to G1. G1 issues a MODIFY CONTEXT command to the Media Gateway that causes the Media Gateway associated with switch G2 to accept incoming TDM traffic from C, convert the TDM traffic to RTP/UDP/IP and send the RTP/UDP/IP to the multicast router. The Media Gateway is instructed to halt receiving TDM traffic from A. The multicast router is instructed to change the mode of A to RECEIVE and the mode of C to SEND. G1 issues a Grant Talk message to G2 which sends a success tone to C indicating that C can now proceed to speak. The multicast session can now proceed as shown with C as the speaker and A, B, and D as the listeners.

If B, for example, issues an Acquire Talk message while speaking control is with C, the message is sent to B's responsible switch G1 which denies the request (because C has not relinquished speaking control) and sends a failure tone message to B.

In a further example, the situation is simplified so that the group call has two participants A and B, with A having speaking control. The network includes a single group call switch G1 which includes a control plane CS and controls two Media Gateways MG1 and MG2. Traffic to and from A travels via MG1 and traffic to and from B travels via MG2, as illustrated in the call flow diagram of FIG. 14.

Since A has speaking control, the system responds to a Relinquish Control command only from A. The command is received by the control plane CS of the G1 which issues a Modify Context command to MG1 instructing MG1 to modify the context of the call by disallowing TDM traffic from A. The system goes into an INACTIVE state awaiting an Acquire Control command. If no such command is received within a specified time period as measured by an inactivity timer, a Call Release request is sent from CS to A and MS B. In addition, destroy context commands are sent to MG1 and MG2. The group call release sequence is complete when Release Complete messages are received from A and B and Destroy Context Complete messages are received from MG1 and MG2.

FIG. 15 illustrates an example of call flow with respect to database record keeping in the case of roaming, i.e., location updates.

Three mobile stations A, B, and C are involved. A and B are the responsibility of a control plane CS1 of a group call switch and C is the responsibility of a control plane CS2 of another group call switch. A roams and issues a location update which is received by CS1 via the BTS and BSC. CS1 consults the index based on IMSI/MIN/ESN to determine the appropriate HLR' for A, e.g., HLR'1, and issues a location update request to HLR'1. HLR'1 determines by its database all of the CUGs to which A belongs. With this information, HLR'1 issues a location update request to CUG AD. Accordingly, CUG AD includes the updated location of A in CUGs to which A belongs.

While roaming, B also issues a location update, which comes to CS1. Based on IMSI/MIN/ESN, CS1 determines the appropriate HLR' for B, namely, HLR'2. CS1 issues a location update request to HLR'2 that finds all CUGs to which B belongs. HLR'2 issues a location update request to CUG AD asking CUG AD to update all CUGs to which B belongs to with the new location of B.

Location updates from C are received at CS2. CS2 determines the appropriate HLR', e.g., HLR'2, sends the location update to HLR'2, which asks the CUG AD to update the corresponding CUGs for C.

Variations

The above embodiments all facilitate the realization of inventive group calling. Subsets of the functionality, however, still provide advantages over the state of the art. For example, group calling using technology other than multicasting on the IP network may still offer many of the advantages discussed above. In particular, standard telephone connections using the PTSN may be inserted in place of IP multicast connections.

In another example, the group call switch may be deployed on the trunk ("the back") side of the MSC. In such an embodiment, the group calling feature may operate as described below.

Figure 16:
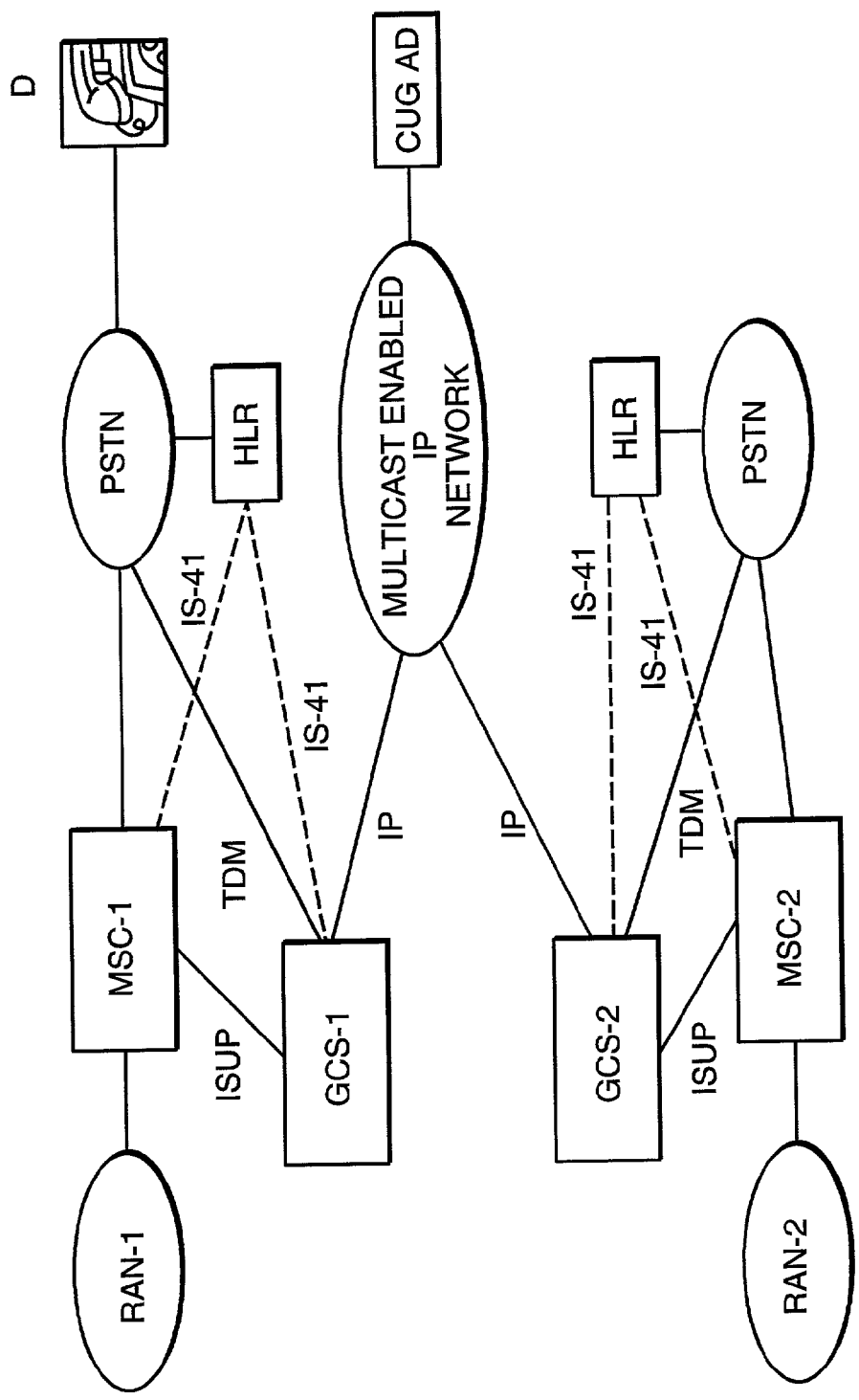

FIG. 16 illustrates a group call switch deployed on the back side of the MSC, with fixed links using standard ISDN User Part ("ISUP") landline signaling. The MSC connects to the Home Location Register ("HLR") using IS-41 (also known as MAP) protocol. The group call switch and the MSC are also inter-connected with bearer trunks that carry voice traffic between the two switches. The group call switch has a TDM connection to the PSTN and an IP connection to an IP network from its data plane (also known as Media Gateway). The group call switch may also query the HLR using IS-41. (FIG. 16 shows the two MSC switches independently connected to the PSTN, but both switches may be connected to the same PSTN.) Both group call switches have access to the Active Directory (CUG-AD) via the IP network.

The deployment shown in FIG. 16 may be used for group calling. For example, Mobile Station (MS) A may be connected to MSC-1 via RAN-1 and two Mobile Stations B and C may be connected to MSC-2 via RAN-2. Subscriber A may have a CUG that includes B and C as members. As explained above, A may use a special group call initiating sequence to signal to the MSC that it wishes to make a group call. MSC-1's logic determines that the incoming call request is a group call and diverts the call request to the group call switch GCS-1 using the ISUP protocol. The group call switch GCS-1 uses its internal logic to access the Active Directory CUG-AD to determine the members of the CUG being called.

In this example, the inquiry yields the MIN numbers of members B and C. In this case of deployment on the back side of the MSC, the group call switch does not have access to location updates; hence the HLR' does not contain the current locations of the called mobile stations. However, the HLR contains this information. Thus, the group call switch GCS-1 may make an IS-41 inquiry ("location request") to the HLR inquiring for the location of the mobile stations B and C. For the purposes of the example, mobile stations B and C may be currently located in a switching area controlled by MSC-2. Following standard mobile telephony practice, this information is contained in the HLR database and the HLR now contacts MSC-2 (via a "route request"). Inasmuch as MSC-2 is using GCS-2 on the trunk side, the route request from the HLR is received by GCS-2. GCS-2 returns a Temporary Local Directory Number ("TLDN") to the HLR which forwards this information to the sender (GCS-1) of the original location request. GCS-1 determines that the TLDN belongs to GCS-2 and notifies GCS-2 about the group call. GCS-2 instructs MSC-2 to set up a group call to mobile stations B and C. Further interactions proceed as described above for the non back side case, with MSC-1 and MSC-2 becoming effectively transparent for the purposes of the group call.

The back side of the switch deployment for group calling has an attendant benefit that may be apparent from FIG. 16. In the case of such a deployment, conventional landline telephones such as telephone D shown in FIG. 16 can also be involved in a group call. Thus, a CUG member may register a landline telephone number as its "reach" number in the CUG Active Directory. If such a subscriber such as D needs to be included in a group call, the relevant group call switch may ask the Serving MSC to complete a PSTN call to D using the stored reach number of the subscriber.

As described above, IP multicast technology may be used as the basic transport technology for group calling. However, in at least some cases, standard implementations of IP multicast technology may prove inefficient for satisfying the needs of widely dispersed CUG members. The dynamic call-by-call setting up of multicast tunnels to carry traffic between multicast-enabled routers may take an excessively long time. Subscribers who experience long group call setup times may either hang up or re-try the call, which may result in unsatisfactory user experience. Long delays in call setup times may also lead to inefficient signaling network utilization.

Figure 17:
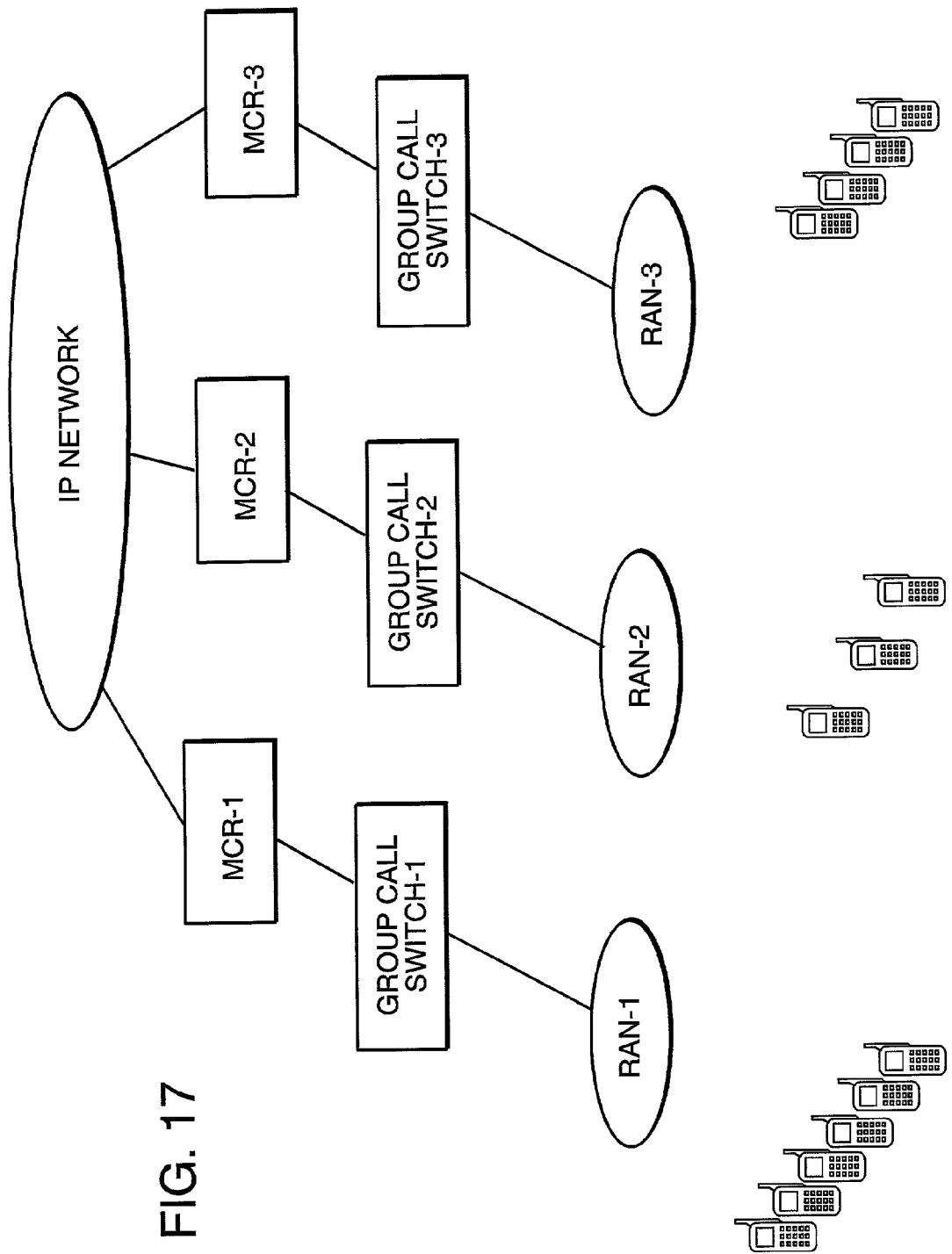

For example, as shown in FIG. 17, a number of multicast-enabled routers, e.g., MCR-1, MCR-2, MCR-3, may be present in an IP network. In the example, the locations of these routers is fixed and is not subject to change. The multicast routers are connected to group call switches (either in front of the MSC or on the back side of the MSC as described above) and hence to mobile telephones via the corresponding Radio Access Networks (RANs). (Although FIG. 17 shows each multicast router connected to a single group call switch, multiple group call switches may be connected to a single router.) If a subscriber initiates a group call based on the members of the relevant CUG, one or more of the multicast routers can be involved in the call. In particular, tunnels are set up between the corresponding multicast routers as noted above. If the setting up of these tunnels is delayed excessively, the quality of the group call may suffer as a result.

As now described, the IP tunnels can be set up ahead of time in such a way that a number of group call initiation requests that arrive later can be serviced by these tunnels. Inasmuch as the tunnels are set up ahead of time, in anticipation of future group call requests, the post-initiation set up delay is thereby reduced or eliminated. The tasks involved include predicting the demand for group calls that are expected to arrive in the future, and determining the topology of the IP tunnels that need to be set up to satisfy the predicted demand.

Demand prediction relies on historical information in the form of group call logs. The history of group calls is divided into a series of windows, with each window being defined over a length of time, known as the "window size", that may range from a couple of minutes to several dozen minutes and is proportional to average holding times of group calls. The actual window size used in demand prediction can be varied based on the desired accuracy of the predictions and the computing resources to be used in deriving the predictions. Generally, shorter window sizes yield more accurate predictions than larger window sizes but cause more wasteful consumption of computational resources. Also, shorter windows tend to be more responsive to bursty traffic and to be less likely to smooth out aberrations. Each window includes a number of group call requests along with the parameters describing the calls, i.e., the number of GIR calls between any two multicast routers. As used below, X(I,J,N) denotes the number of group calls between routers I and J in window N.

The following example illustrates predicting the future demand for group calls. In the example, the history of group calls is divided into 4 windows, with window 1 being the earliest in time and window 4 being the latest in time (i.e., the current window). To calculate the demand in the next (future) window, i.e., window 5, the following smoothing formula is used:

$$X(I,J,5)=(1-\alpha)*X(I,J,4)+\alpha*(1-\alpha)*X(I,J,3) + \alpha*\alpha*(1-\alpha)*X(I,J,2)+\alpha*\alpha*\alpha*(1-\alpha)*X(I,J,1)$$

In the formula, $\alpha$ (alpha) is an empirically determined weight factor with a value between 0 and 1. As expressed in the formula, the prediction of traffic for the next window of time is based on giving more preference to more recent windows than to earlier windows. This preference is clearly apparent if the formula is re-written in its more general recurrence form, as follows:

$$X(I,J,N)=(1-\alpha)*X(I,J,N-1)+\alpha*X'(I,J,N-1)$$

where X'(I,J,N−1) is the smoothed estimate encapsulating the past history up to N−1.

In the formula, "Current" refers to the latest window in the time sequence. Based on this formula and given a history (windows 1 through N) of demands, as exemplified by the values of the parameter X(I,J,N), a table of values T(I,J) ("demand matrix") can be calculated for the next window such that the value in row I and column J represents the number of predicted group calls in the upcoming window between multicast routers I and J.

With respect to determining the topology of the tunnels for satisfying the demand, the following information is used as inputs: the point to point demand matrix for group calls between any two multicast routers; a cost structure of the tunnels by the service provider, i.e., the cost for establishing a tunnel of a particular capacity between any two routers; the service provider's delay guarantees, i.e., the maximum delay in the IP transport network between any two particular multicast routers; and quality of service ("QoS") constraints that need to be satisfied by the group calls.

In view of such inputs, the topology of the tunnels between the multicast routers, i.e., which tunnels with what capacity to connect which multicast routers, is determined in a way such that the topology accounts for the following constraints: the tunnels emanating from each multicast router do not exceed the total output capacity of the router (in bits per second), and the number of tunnels emanating from each multicast router does not exceed the internal limit on the number of tunnels of the router.

As described below, a mathematical optimization technique of Integer Linear Programming ("ILP") is used in determining the least cost topology, in view of the following points as explained below: a recognition that the case is "NP-hard"; and a formulation of the task as a degree constrained multi-commodity flow that can be solved using ILP techniques.

According to the theory of NP-hardness, a case that can be shown to be NP-hard is not expected to have an efficient algorithmic solution. A given case, e.g., X, may be shown to be NP-hard by considering a case already regarded as NP-hard, e.g., Y, and showing that Y reduces to X in a polynomial time transformation. The tunnel topology design case can be shown to be NP-hard by observing that it is a generalization of the unsplittable multi-commodity flow problem (see J. Kleinberg, "Single source unsplittable flow," Proc. of the 37th IEEE Symposium on Foundations of Computer Science, 1996.).

Thus, the tunnel topology case is recast in a form, shown below, that is suitable for application of ILP approximation techniques.

Input

Let N denote the number of multicast routers in the network.

Let D(max,I) denote the maximum number of tunnels that router I can set up.

Let p(t,l) denote the unit cost of tunnel l for trunk of type t. Here, "l" denotes a pair of nodes l=(i,j) for multicast-enabled routers (MCRs) i and j.

Let τ (Tau) denote the set of all possible types of trunks (DS0, DS1, OC3, etc.) Let T(I,J) denote the demand matrix, i.e., the predicted group call traffic between routers I and J for a given future time period.

Let C(I) denote the capacity of router I in bits per second.

Let R(I,J) be the set of all feasible routes for routing traffic between router I and J. (This is a pre-processing step that generates all feasible quality of service paths between MCRs I and J.)

Output Decision Variables

Y(t,l): number of units of type t trunks allocated on link l.

X(p): amount of traffic flow on path p.

$z_l$: a binary valued variable with value 1 if link "l" is allocated non-zero capacity; otherwise its value is 0.

ILP Formulation

Minimize $$\sum_l \sum_{t \in \tau} p_l^t y_l^t$$

subject to

Demand Satisfaction (the tunnel topology satisfies the demand matrix):

$$\sum_{p \in R_{ij}} x_p \geq T_{ij} \forall_{i,j}$$

Sufficient Tunnel Capacity (the total flow on all paths can be handled by the capacity of the chosen trunks):

$$\sum_{ij} \sum_{p \in R_{ij}} x_p \leq \sum_{t \in \tau} y_l^t \quad \forall \, l$$

and $l \in p$

Port Constraints (the number of tunnels emanating and terminating into a router do not exceed the router's internal set maximum):

$$\sum_{l:(i,j)=l} z_l \leq D_i^{max} \forall_i$$

$$\sum_{l:(i,j)=l} z_l \leq D_j^{max} \forall_j$$

The analysis above is formalized below.

| INPUT | |
|---|---|
| N: | number of routers |
| $D_i^{max}$: | maximum number of tunnels that router i can set up |
| $\rho_l^t$: | unit cost of tunnel l for type t trunk |
| τ: | set of all possible types of trunks |
| $T_{(I, J)}$: | demand matrix T(I, J) |
| $C_i$: | capacity of router i (bits/sec) |
| $R_{ij}$: | set of all feasible routes to route traffic between router i and j |
| OUTPUT DECISION VARIABLES | |
| $y_l^t$: | number of units of trunks of type t allocated to link l |
| $x_p$: | amount of flow (traffic volume) on paths p |
| $z_l$: | =1 if link l is allocated non-zero capacity |
| | =0 otherwise |

ILP Formulation

Minimize $$\sum_l \sum_{t \in \tau} p_l^t y_l^t$$

subject to

Demand Satisfaction $$\sum_{p \in R_{ij}} x_p \geq T_{ij} \forall_{i,j}$$

Sufficient Tunnel Capacity $$\sum_{ij} \sum_{p \in R_{ij}} x_p \leq \sum_{t \in \tau} y_l^t \quad \forall \, l$$

and $l \in p$

Port Constraints $$\sum_{1:(i,j)=\Delta_1} Z_1 \leq D_i^{max} \forall_i$$

$$\sum_{1:(i,j)=\Delta_1} Z_1 \leq D_j^{max} \forall_j$$

Tunnel Existence Constraint $$Z_1 \geq \frac{\sum_{t \in \tau} y_1^t \forall 1}{M} \text{ where } M = \left(\sum_i \sum_j T_{ij}\right) + \varepsilon$$

where ε, a damping coefficient, is a user given parameter having a value is greater than zero.

In addition, to the extent the embodiments have been described in the context of particular wireless technologies such as TDMA or CDMA protocols, the embodiments may also be modified to work with wireless technologies including one or more of the following: TDMA, CDMA, GSM, IS-136, and other 2G and 3G protocols.

Having described an exemplary embodiment, it should be apparent to persons of ordinary skill in the art that changes may be made to the embodiment described without departing from the spirit and scope of the invention.

What is claimed is:

1. A method for use in establishing a group call, comprising:
   in a first proxy switch, detecting a group call request from a first mobile station;
   informing a second proxy switch of the group call request;
   in the second proxy switch, retrieving information from a list of members of a group call group; and
   based on the retrieved information, establishing a group call between first and second mobile stations (MS) via the first and second proxy switches,
   wherein
   by the first proxy switch,
     when a first connection to the first proxy switch for the first mobile station has been created, acquiring a first channel for the first mobile station;
     paging the second mobile station upon receiving an instruction from the second proxy switch;
     informing the second proxy switch when the second mobile station is found;
     when a second connection to the first proxy switch for the second mobile station has been created, acquiring a second channel for the second mobile station; and
     informing the second proxy switch when the second mobile station is on channel.

2. A method for use in establishing a group call, comprising:
   in a first proxy switch, detecting a group call request from a first mobile station;
   informing a second proxy switch of the group call request;
   in the second proxy switch, retrieving information from a list of members of a group call group; and
   based on the retrieved information, establishing a group call between first and second mobile stations (MS) via the first and second proxy switches, wherein
   by the second proxy switch,
     creating a first connection to the first proxy switch for the first mobile station;
     instructing the first proxy switch to page the second mobile station;
     when informed that the second mobile station has been found, creating a second connection to the first proxy switch for the second mobile station;
     when informed that the second mobile station is on channel, instructing the first proxy switch to inform the first mobile station that a connection has been established; and
     playing a tone to the first mobile station through the first connection.

3. A method for use in establishing a group call, comprising:
   in a first proxy switch of a plurality of proxy switches, detecting a group call request from a first mobile station, wherein the first mobile station is serviced by the first proxy switch;
   informing a second proxy switch of the plurality of proxy switches of the group call request;
   in the second proxy switch, retrieving information from a list of members of a group call group; and
   based on the retrieved information, establishing group call between first and second mobile stations via the plurality of proxy switches, wherein the second mobile station is serviced by a third proxy switch of the plurality of proxy switches; and wherein
   when a first connection to the first proxy switch for the first mobile station has been created, acquiring a first channel for the first mobile station by the first proxy switch;
   by the third proxy switch, paging the second mobile station upon receiving an instruction from the second proxy switch;
   by the third proxy switch, informing the second proxy switch when the second mobile station is found;
   by the third proxy switch, acquiring a second channel for the second mobile station when a second connection to the third proxy switch for the second mobile station has been created; and
   informing the second proxy switch when the second mobile station is on channel.

4. A method for use in establishing a group call, comprising:
   in a first proxy switch of a plurality of proxy switches detecting a group call request from a first mobile station, wherein the first mobile station is serviced by the first proxy switch;
   informing a second proxy switch of the plurality of proxy switches of the group call request;
   in the second proxy switch, retrieving information from a list of members of a group call group; and
   based on the retrieved information, establishing a group call between first and second mobile stations via the plurality of proxy switches, wherein the second mobile station is serviced by a third proxy switch of the plurality of proxy switches; and wherein
   by the second proxy switch,
     creating a first connection to the first proxy switch for the first mobile station;
     instructing the third proxy switch to page the second mobile station;
     when informed that the second mobile station has been found, creating a second connection to the third proxy switch for the second mobile station;

when informed that the second mobile station is on channel, instructing the first proxy switch to inform the first mobile station that a connection has been established; and playing a tone to the first mobile station through the first mobile gateway connection.

* * * * *